(12) United States Patent
Awatsu

(10) Patent No.: US 11,106,411 B2
(45) Date of Patent: Aug. 31, 2021

(54) FILE MANAGEMENT APPARATUS, NON-TRANSITORY COMPUTER READABLE MEDIUM STORING FILE MANAGEMENT PROGRAM, AND FILE MANAGEMENT SYSTEM

(71) Applicant: FUJIFILM Business Innovation Corp., Tokyo (JP)

(72) Inventor: Yusaku Awatsu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/506,993

(22) Filed: Jul. 9, 2019

(65) Prior Publication Data

US 2020/0278820 A1    Sep. 3, 2020

(30) Foreign Application Priority Data

Feb. 28, 2019    (JP)    .............................. JP2019-035750

(51) Int. Cl.
*G06F 15/00* (2006.01)
*G06F 3/12* (2006.01)
*G06F 21/62* (2013.01)

(52) U.S. Cl.
CPC .......... *G06F 3/1267* (2013.01); *G06F 3/1206* (2013.01); *G06F 3/1222* (2013.01); *G06F 3/1238* (2013.01); *G06F 21/6209* (2013.01)

(58) Field of Classification Search
CPC .... G06F 3/1267; G06F 3/1206; G06F 3/1222; G06F 3/1238; G06F 21/6209

USPC ........................................................ 358/1.14
See application file for complete search history.

(56) References Cited

U.S. PATENT DOCUMENTS

| | | | |
|---|---|---|---|
| 2011/0302410 A1* | 12/2011 | Clarke | H04L 63/0428 713/155 |
| 2016/0171238 A1* | 6/2016 | Sibillo | H04L 9/0866 713/164 |
| 2018/0260578 A1* | 9/2018 | Orloff | G06F 16/182 |
| 2019/0205686 A1* | 7/2019 | Mayer | G06K 9/00442 |

FOREIGN PATENT DOCUMENTS

JP    2001-067191    3/2001

* cited by examiner

*Primary Examiner* — Mark R Milia
(74) *Attorney, Agent, or Firm* — JCIPRNET

(57) ABSTRACT

A file management apparatus includes a generation part that generates a coded file having a content processed not to be browsed in a user terminal from a file using key information associated with identification information of the file in a case where the identification information of the file is received from the user terminal before an expiry of the file in a storage device, and a control part that performs control for transmitting the coded file generated by the generation part to the user terminal as a transmission source of the identification information of the file and, in a case where the identification information of the file is received from an information processing apparatus after the expiry of the file, causing the content of the coded file input into the information processing apparatus to be browsed using the key information by transmitting the key information associated with the identification information of the file to the information processing apparatus as a transmission source of the identification information of the file.

20 Claims, 19 Drawing Sheets

FIG. 5

| IDENTIFICATION INFORMATION | FILE INFORMATION | EXPIRY | ENCRYPTION KEY |
|---|---|---|---|
| 00001 | D:¥data/00001/file1.img | 4/1/2019 12:00:00 | 5EVy5CNV |
| 00002 | D:¥data/00002/file2.img | 4/3/2019 15:30:00 | wS22n9qGY |
| : | : | : | : |

29

FIG. 11A
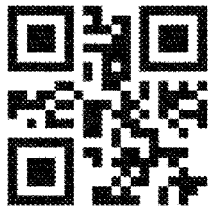
FIG. 11B
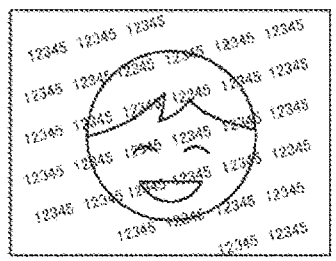
FIG. 12
PRINT APPLICATION AFTER EXPIRY
IN CASE OF DESIRING PRINTING AFTER EXPIRY,
PLEASE INPUT IDENTIFICATION INFORMATION IN FIELD BELOW, AND PRESS "APPLY" BUTTON.
APPLY
15A

FIG. 13

PRINT APPLICATION AFTER EXPIRY

IN CASE OF DESIRING PRINTING AFTER EXPIRY,

PLEASE INPUT IDENTIFICATION INFORMATION FILE IN FIELD BELOW, AND PRESS "APPLY" BUTTON.

REFERENCE ···

OR

DROP IDENTIFICATION INFORMATION FILE TO BE UPLOADED

APPLY

15B

FILE MANAGEMENT APPARATUS, NON-TRANSITORY COMPUTER READABLE MEDIUM STORING FILE MANAGEMENT PROGRAM, AND FILE MANAGEMENT SYSTEM

CROSS-REFERENCE TO RELATED APPLICATIONS

This application is based on and claims priority under 35 USC 119 from Japanese Patent Application No. 2019-035750 filed Feb. 28, 2019.

BACKGROUND

(i) Technical Field

The present invention relates to a file management apparatus, a non-transitory computer readable medium storing a file management program, and a file management system.

(ii) Related Art

A print system that provides print data requested by a user by setting an expiry is known.

JP2001-067191A discloses a print system configured with a print request side issuing a print request for print data and a printer printing the print data based on the print request issued from the print request side. The print request side includes issue time information of the request in the print request. In a case where the printer receives the print request and determines that it is late to start printing the print data in response to the print request based on the issue time information, the printer rejects the print request.

SUMMARY

In a case where an expiry is set on a file provided through a communication line, a user desiring to obtain the file needs to obtain the desired file within the expiry from a server in which the file is registered. Accordingly, the user who cannot obtain the file within the expiry due to any reason has to request a register of the file to re-register the desired file in the server in order to obtain the file. However, since an unnecessary load is imposed on the register of the file, the request may not be easily made.

In such a case, a method of individually exchanging the file between the register of the file and the user desiring to obtain the file through the communication line without causing the register of the file to re-register the file is considered. However, the exchange of the file is not performed through a server that is secured against information leakage. Thus, the file may be unintentionally leaked to a third party.

Aspects of non-limiting embodiments of the present disclosure relate to a file management apparatus, a non-transitory computer readable medium storing a file management program, and a file management system capable of providing an expired file from an information processing apparatus without causing a register of the file to re-register the expired file even in a case where a file requested by a user is expired and is deleted from a storage device.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a file management apparatus including a generation part that generates a coded file having a content processed not to be browsed in a user terminal from a file using key information associated with identification information of the file in a case where the identification information of the file is received from the user terminal before an expiry of the file in a storage device, and a control part that performs control for transmitting the coded file generated by the generation part to the user terminal as a transmission source of the identification information of the file and, in a case where the identification information of the file is received from an information processing apparatus after the expiry of the file, causing the content of the coded file input into the information processing apparatus to be browsed using the key information by transmitting the key information associated with the identification information of the file to the information processing apparatus as a transmission source of the identification information of the file.

BRIEF DESCRIPTION OF THE DRAWINGS

Exemplary embodiment(s) of the present invention will be described in detail based on the following figures, wherein:

FIG. 5 is a diagram illustrating one example of registration information of a file;

FIGS. 11A and 11B are diagrams illustrating an example of identification information using an image;

FIG. 12 is a diagram illustrating one example of an application screen for requesting the file management apparatus to output an encryption file using the identification information represented as a text;

FIG. 13 is a diagram illustrating one example of an application screen for requesting the file management apparatus to output the encryption file using the identification information represented as an image;

DETAILED DESCRIPTION

Hereinafter, the present exemplary embodiment will be described with reference to the drawings. Constituents and processes having the same functions will be designated by the same reference signs throughout the drawings, and descriptions of such constituents and processes will not be repeated.

Figure 1:
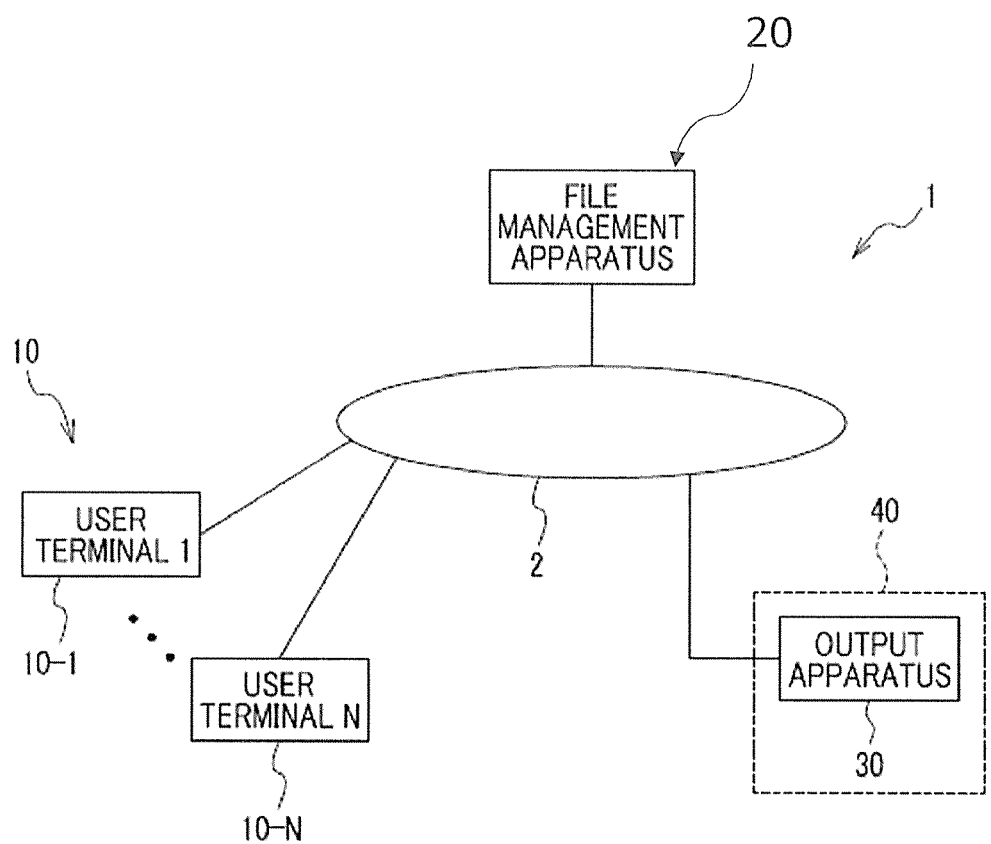
FIG. 1 is a diagram illustrating a system configuration example of a file management system.

FIG. 1 is a diagram illustrating a system configuration example of a file management system 1 according to the present exemplary embodiment. The file management system 1 includes a user terminal 10, a file management apparatus 20, and an output apparatus 30. The user terminal 10, the file management apparatus 20, and the output apparatus 30 are connected to a communication line 2.

The communication line 2 in the file management system 1 may be a wired line or a wireless line or may be a line in which a wired line and a wireless line are mixed. Furthermore, the communication line 2 may be a dedicated line or a public line such as the Internet that is shared between an unspecified large number of apparatuses.

The user terminal 10 is an apparatus used by a user (hereinafter, referred to as a "registration user") registering a file in the file management apparatus 20 or a user (hereinafter, referred to as an "output user") outputting a file registered in the file management apparatus 20 from the output apparatus 30. An information apparatus such as a desktop computer, a tablet computer, a smartphone, or a wearable terminal that has an input-output function of providing an interface with the user, a processing function of processing information, and a communication function of performing data communication through the communication line 2 is used as the user terminal 10. A person using the file management system 1 including the registration user and the output user will be collectively referred to as the "user".

The "file" according to the present exemplary embodiment is an aggregate of data that is collected in a predetermined format and represents specific information.

The number of user terminals 10 included in the file management system 1 is not restricted, and N (N is an integer greater than or equal to 1) number of user terminals 10 are connected to the communication line 2. In the case of individually representing the user terminals 10, reference signs "-1" to "-N" are added to the end of the user terminals 10 as illustrated in FIG. 1. The representation "user terminal 10" will be used unless individual descriptions of the user terminal 10-1 to the user terminal 10-N are necessary. One user may have plural user terminals 10.

The file management apparatus 20 is an apparatus that stores the file received from the registration user in a storage device and, in a case where the output user requests the file stored in the file management apparatus 20 from the output apparatus 30, obtains the requested file from the storage device and provides the file to the user. Storing the file received from the registration user in the storage device and providing a desired file stored in the storage device to at least one user will be referred to as "registering the file".

In the same manner as the user terminal 10, an information apparatus having an input-output function of providing an interface with a manager of the file management apparatus 20, a processing function of processing information, and a communication function of performing data communication through the communication line 2 is used as the file management apparatus 20. The file management apparatus 20 needs to parallelly process requests from the plural user terminals 10 and the output apparatus 30. Thus, for example, a computer called a "server" or a "workstation" having a higher information processing performance than the user terminal 10 is used as the file management apparatus 20.

The process of the file management apparatus 20 having a higher information throughput than the user terminal 10 may be distributed to plural information apparatuses. For example, the file management apparatus 20 may be implemented using a cloud computing service.

The output apparatus 30 is an apparatus that is installed in a location such as a public accommodation, a company, and a store 40 different from a house where the user lives. The installation location in which the output apparatus 30 is installed may be any location other than the house where the user lives. An example in which the output apparatus 30 is installed in the store 40 such as a convenience store where an unspecified large number of users can enter and exit without permission will be described.

In FIG. 1, the number of stores 40 including the output apparatus 30 is one for convenience of description. In actuality, plural stores 40 including the output apparatus 30 are present, and the output apparatus 30 of each store 40 is connected to the communication line 2. The number of output apparatuses 30 included in one store 40 is not restricted. One store 40 may include plural output apparatuses 30.

The output apparatus 30 outputs the file specified by the output user in connection with the file management apparatus 20. The "output of the file" means setting a state where the content of the file can be recognized. A subject that recognizes the content of the file is not limited to the output user and may be an electronic apparatus. Accordingly, one form of representing an example of the output of the file includes a form of displaying the content of the file on a display device, a form of printing on a recording medium such as paper, a form of providing a voice notification, a form of storing in a storage medium, and a form of transferring the file to another electronic apparatus through the output apparatus 30. Hereinafter, for example, it will be assumed that the output apparatus 30 notifies the output user of the content of the file by printing the content of the file on the recording medium. The output apparatus 30 is one example of an information processing apparatus according to the present exemplary embodiment.

Figure 2:
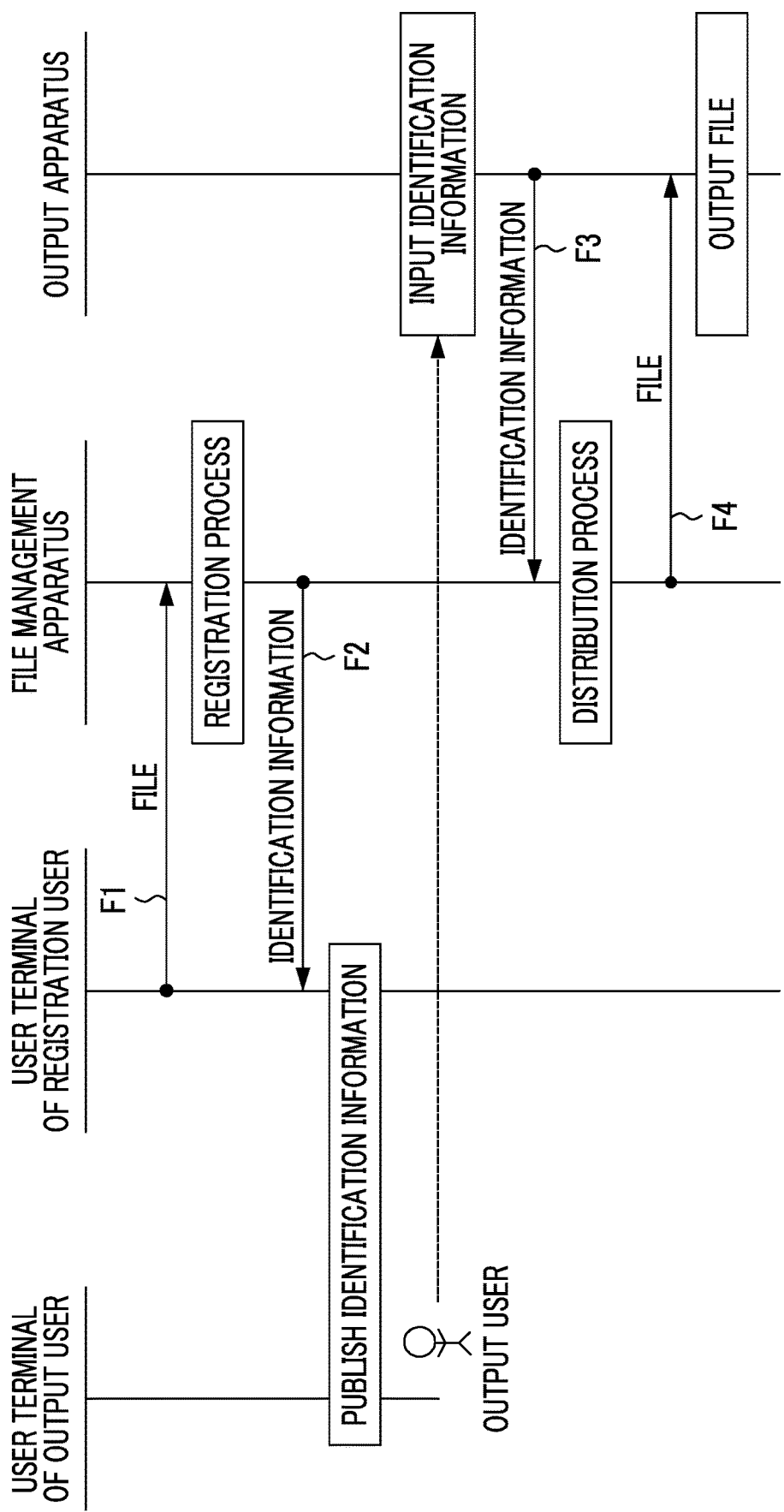
FIG. 2 is a sequence diagram illustrating one example of a flow of information in the file management system.

FIG. 2 is one example of a sequence diagram illustrating a flow of information in a file provision service using the file management system 1. The file provision service using the file management system 1 will be described with reference to FIG. 2.

First, the registration user operates the user terminal 10 and transmits the file to be used by other users to the file management apparatus 20 (F1 in FIG. 2). The content of the file transmitted to the file management apparatus 20 may be any content that complies with the output form of the file in the output apparatus 30. For example, in a case where a service for printing the content of the file on the recording medium is performed in the output apparatus 30, print data such as a book cover and a paper craft created by the registration user is transmitted to the file management apparatus 20.

The file management apparatus 20 receiving the file from the registration user executes a registration process for the received file. The file management apparatus 20 generates identification information associated with the file in the registration process, transmits the generated identification information to the user terminal 10 as the transmission source of the file, and notifies the registration user of the completion of the registration of the file (F2 in FIG. 2).

The identification information is an identifier that is uniquely associated with the file. By referring to the identification information, one specific file is selected from plural files registered in the file management apparatus 20.

In order for the file registered in the file management apparatus 20 to be used by other users, for example, the registration user publishes the identification information received in the user terminal 10 to other users along with introduction information indicating a summary of the content of the file indicating the content included in the file registered in the file management apparatus 20 using a mailing list or a social networking service (SNS). Hereinafter, the identification information and the introduction information of the file corresponding to the identification information may be represented as the "identification information and the like".

A method of publishing the identification information and the like to other users is not limited to a method through the communication line 2. For example, a leaflet in which the identification information and the like are disclosed may be distributed, or a notification of the identification information and the like may be provided through television and radio.

The file management apparatus 20 does not have a function of transmitting the file registered by the registration user to the user terminal 10. Thus, among users perceiving the presence of the file by the publication of the identification information and the like, the output user who is interested in the content of the file and desires to output the file visits the store 40 and inputs the identification information of the desired file into the output apparatus 30.

The identification information input by the output user is transmitted to the file management apparatus 20 from the output apparatus 30 (F3 in FIG. 2). In the file management apparatus 20, a distribution process of distributing the file corresponding to the received identification information among registered files is executed. In a case where the file corresponding to the identification information is transmitted to the output apparatus 30 from the file management apparatus 20 by the distribution process (F4 in FIG. 2), the output apparatus 30 outputs the file to the output user by printing the content of the received file on the recording medium.

Files include a file that is output for free in the output apparatus 30 and a file that has a fee. Thus, in the case of outputting the file having a fee in the output apparatus 30, the output user pays the fee set for the desired file. For example, data of the paid fee is managed for each file in the file management apparatus 20. The amount of money corresponding to the number of outputs of the file is deposited into a bank account or the like of the registration user registering the file.

FIG. 2 illustrates an example in which the user other than the registration user registering the file in the file management apparatus 20 outputs the file in the output apparatus 30. Such a form of usage of the file in which the registration user and the output user are different may be referred to as "shared usage". A form of usage in which the registration user outputs the file in the output apparatus 30 without publishing the identification information of the file registered in the file management apparatus 20 may be referred to as "individual usage". The file provision service according to the present exemplary embodiment is based on the shared usage of the file.

A file expiry for each file is set on the file registered in the file management apparatus 20. In a case where the file expires, the file management apparatus 20 deletes the file from the storage device so that the vacant capacity of the storage device storing the registered file is not depleted by the file registered in the file management apparatus 20. Accordingly, the sequence diagram of the file provision service illustrated in FIG. 2 represents a sequence in a case where the file is output from the output apparatus 30 before the file desired by the output user expires.

In addition to the file provision service described using FIG. 2, the file management system 1 also provides, as will be described below, a service for outputting the requested file from the output apparatus 30 in a case where the expired file is deleted from the storage device of the file management apparatus 20 but is requested by the output user.

Next, a functional configuration of each apparatus included in the file management system 1 that can also provide the expired file to the output user will be described.

Figure 3:
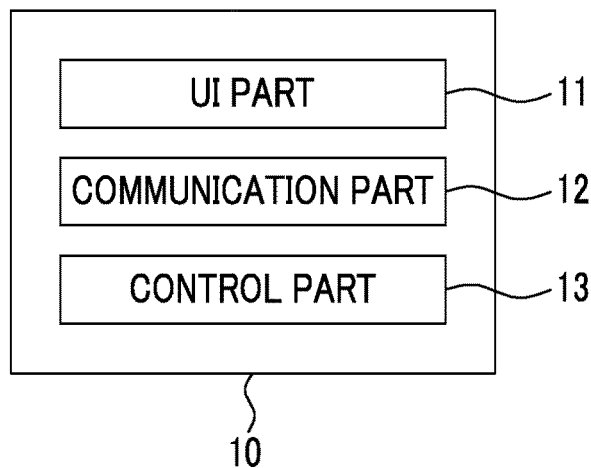
FIG. 3 is a block diagram illustrating a functional configuration example of a user terminal.

FIG. 3 is a block diagram illustrating a functional configuration example of the user terminal 10. As illustrated in FIG. 3, the user terminal 10 includes a user interface (UI) part 11, a communication part 12, and a control part 13.

The UI part 11 receives an instruction from the user and notifies the user of various information such as a response to the instruction. Specifically, the UI part 11 receives a file registration instruction from the registration user and provides a notification of the identification information of the file registered in the file management apparatus 20. In addition, for example, the UI part 11 receives a posting instruction for posting the identification information and the like on an SNS website from the registration user and provides a notification of the content posted on the SNS website.

The communication part 12 transmits and receives various information with other apparatuses included in the file management system 1 and other apparatuses not included in the file management system 1 through the communication line 2. Hereinafter, other apparatuses not included in the file management system 1 will be referred to as "external apparatuses".

The control part 13 controls the user terminal 10 in accordance with an instruction received from the UI part 11 and information received from the communication part 12 such that a process corresponding to each instruction and information is performed.

Figure 4:
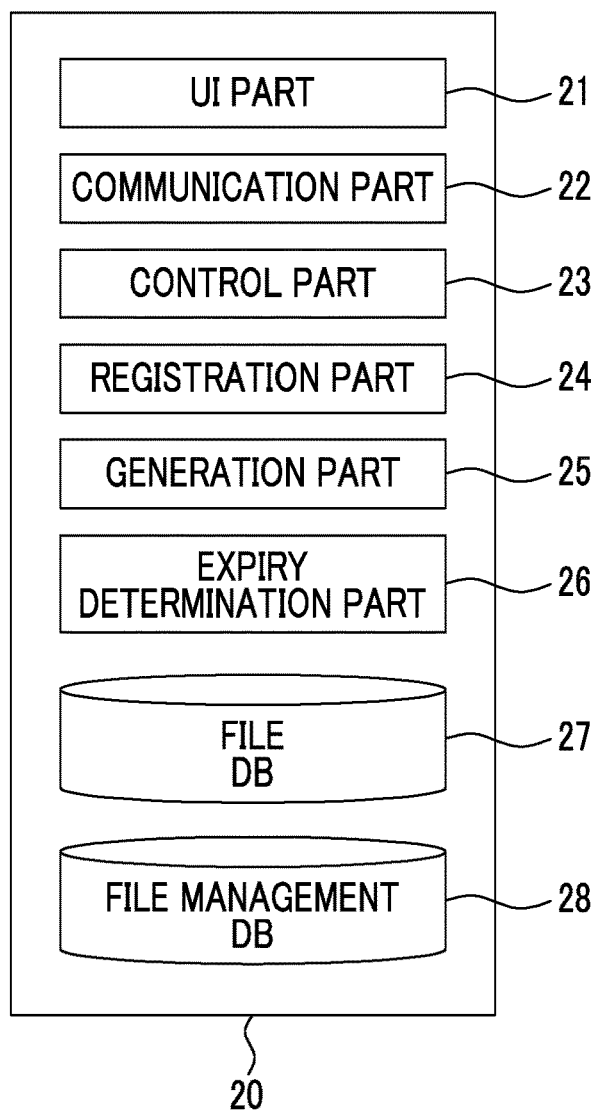
FIG. 4 is a block diagram illustrating a functional configuration example of a file management apparatus.

FIG. 4 is a block diagram illustrating a functional configuration example of the file management apparatus 20. As illustrated in FIG. 4, the file management apparatus 20 includes function parts of a UI part 21, a communication part 22, a control part 23, a registration part 24, a generation part 25, and an expiry determination part 26, a file database (DB) 27, and a file management DB 28.

The UI part 21 receives an instruction from the manager of the file management apparatus 20 and notifies the manager of various information such as a response to the instruction and information of the file registered in the file management apparatus 20.

The communication part 22 transmits and receives various information with other apparatuses included in the file management system 1 and the external apparatuses through the communication line 2.

The control part 23 controls the file management apparatus 20 in accordance with an instruction received from the UI part 21 and information received from the communication part 22 such that a process corresponding to each instruction and information is performed.

The registration part 24 registers the file received from the user terminal 10 in the file DB 27 and registers registration information 29 of the registered file in the file management DB 28 under control of the control part 23. The registration information 29 of the file is information as an aggregate of various information related to the file and is information that is referred to by the file management apparatus 20 in the management of the file.

In addition, the registration part 24 deletes a specified file (for example, the expired file) from the file DB 27 and deletes the registration information 29 of the deleted file from the file management DB 28 under control of the control part 23.

The generation part 25 generates the identification information of the file received from the user terminal 10 under control of the control part 23.

In addition, even in a case where the output user requests the expired file, the generation part 25 generates a coded file of the file corresponding to the identification information in advance under control of the control part 23 in a case where the identification information of the file is received from the user terminal 10, so that the requested file is output in the output apparatus 30. The generated coded file is transmitted to the user terminal 10 as the transmission source of the identification information under control of the control part 23.

The "coded file" is a file that is processed such that the content of the file itself is not browsed. Accordingly, even in a case where the coded file is received in the user terminal 10, the output user cannot browse the content of the coded file in the user terminal 10. The content of the coded file is browsed using key information that can decode the coded file. The file management apparatus 20 transmits the key information to only the output apparatus 30. Thus, in the case of outputting the expired file, the output user inputs the coded file into the output apparatus 30, decodes the coded file in the output apparatus 30 using the key information transmitted from the file management apparatus 20, and outputs the coded file.

The coded file may have any form of file provided that the content of the file is browsed using the key information. For example, a file in which a password is set such that the content of the file cannot be browsed unless a correct password is input is one example of the coded file, and the password is one example of the key information.

In addition, for example, a file that is encrypted using an encryption key such that the content of the file cannot be browsed unless the encryption key used in the encryption is used is one example of the coded file. In this case, the encryption key used in the encryption is one example of the key information.

In the present exemplary embodiment, an example in which the generation part 25 generates an encryption file by encrypting the file using the encryption key will be described. That is, the encryption file is one example of the coded file according to the exemplary embodiment.

The expiry determination part 26 determines whether the file corresponding to the identification information is before the expiry of the file or is expired under control of the control part 23.

In a case where the identification information is received from the user terminal 10 and the expiry determination part 26 determines that the file corresponding to the received identification information is before the expiry of the file, the control part 23 controls the generation part 25 and the communication part 22 to generate the encryption file of the file corresponding to the received identification information and transmit the generated encryption file to the user terminal as the transmission source of the identification information.

In addition, in a case where the identification information is received from the output apparatus 30 and the expiry determination part 26 determines that the file corresponding to the received identification information is before the expiry of the file, the control part 23 controls the communication part 22 to transmit the file corresponding to the received identification information to the output apparatus 30. In a case where the identification information is received from the output apparatus 30 and the expiry determination part 26 determines that the file corresponding to the received identification information is expired, the control part 23 controls the communication part 22 to transmit the encryption key of the file corresponding to the received identification information to the output apparatus 30.

The file DB 27 is a storage area in which the file registered in the file management apparatus 20 by the registration user is stored. The file DB 27 may be implemented in the storage device incorporated in the file management apparatus 20 or may be implemented in a file server as one example of the external apparatuses connected to the communication line 2.

The file management DB 28 is a storage area in which the registration information 29 of the file is stored for each file. In the same manner as the file DB 27, the file management DB 28 may be implemented in either the storage device incorporated in the file management apparatus 20 or the file server as one example of the external apparatuses connected to the communication line 2.

FIG. 5 is a diagram illustrating one example of the registration information 29 of the file stored in the file management DB 28.

In the registration information 29 of the file, for example, the identification information, file information, the expiry, and the encryption key are managed in association with each other for each file.

The identification information associated with the file is set in the identification information of the registration information 29. The identification information may be represented in any format provided that the registered file is uniquely specified by the identification information. For example, the identification information is represented as a text. The type of text used as the identification information is not restricted. For example, an English text, a number, a symbol, or a combination thereof is used. In the example in FIG. 5, the identification information is represented as a five-digit number. Hereinafter, a case where the identification information is represented as a text will be described.

In the file information of the registration information 29, a storage location of the registered file in the file DB 27 is set in a directory format. The directory format is a display method of adding directory information representing the storage location of the file to the file name. The control part 23 obtains the file corresponding to the identification information from the file DB 27 by referring to the file information. In a case where the file is stored in the external apparatus, a uniform resource locator (URL) of the file is set in the file information. The file information in the registration information 29 of the file illustrated in FIG. 5 is a setting example in a case where the file DB 27 is implemented in the storage device incorporated in the file management apparatus 20.

The expiry of the file is set in the expiry of the registration information 29. The expiry of the file is set in advance. For example, the expiry is set to be one week after the time of reception of the file from the user terminal 10 of the registration user. The expiry of the file can be changed by the manager of the file management apparatus 20. In addition, for example, a different expiry is set for each file depending on the type of received file and the registration user.

The encryption key used in the generation of the encryption file for the file is set in the encryption key of the registration information 29. For example, a randomly generated text string is used as the encryption key. For example, the encryption key is set to have a different value for each file so that the contents of the encryption files of other files are not browsed even in a case where the encryption key of any file is leaked to the outside of the file management system 1.

Figure 6:
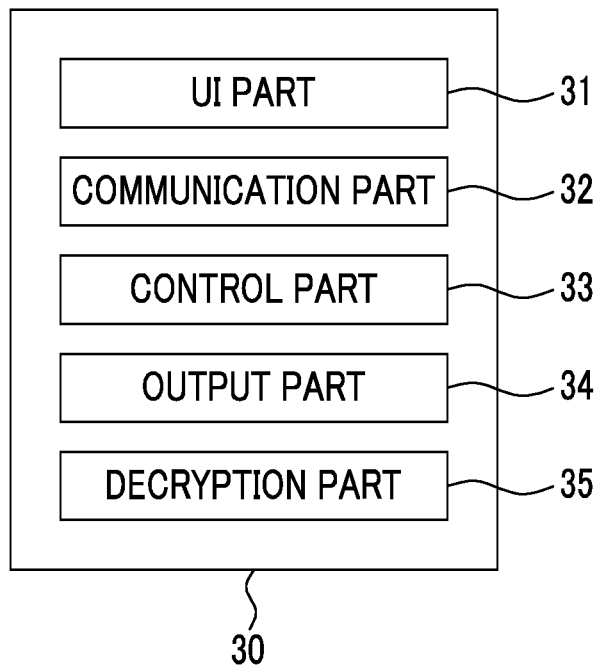
FIG. 6 is a block diagram illustrating a functional configuration example of an output apparatus.

FIG. 6 is a block diagram illustrating a functional configuration example of the output apparatus 30. As illustrated in FIG. 6, the output apparatus 30 includes function parts of a UI part 31, a communication part 32, a control part 33, an output part 34, and a decryption part 35.

The UI part 31 receives an instruction from the output user operating the output apparatus 30 and notifies the output user of various information such as a response to the instruction and a process status related to the output of the file.

The communication part 32 transmits and receives various information with other apparatuses included in the file management system 1 and the external apparatuses through the communication line 2.

The control part 33 controls the output apparatus 30 to output the file corresponding to the identification information input into the UI part 31 by the output user in accordance with the instruction received from the UI part 31 and the information received from the communication part 32.

Specifically, in a case where the file corresponding to the identification information input from the UI part 31 by the output user is received in the communication part 32, the control part 33 controls the output part 34 to output the received file. In addition, in a case where the encryption key corresponding to the identification information input from the UI part 31 by the output user is received in the communication part 32, the control part 33 controls the UI part 31 to notify the output user that the encryption file encrypted using the key information is to be input. Furthermore, the control part 33 controls the decryption part 35 to decrypt the encryption file using the received encryption key and controls the output part 34 to output the decrypted file.

The output part 34 outputs the file desired by the output user by printing the content of the file corresponding to the identification information input by the output user on the recording medium under control of the control part 33.

The decryption part 35 decrypts the encryption file corresponding to the identification information using the encryption key transmitted from the file management apparatus 20 and restores the encryption file to the original file before the encryption using the encryption key under control of the control part 33.

Next, a basic configuration example of an electrical system in each apparatus included in the file management system 1 will be described.

Figure 7:
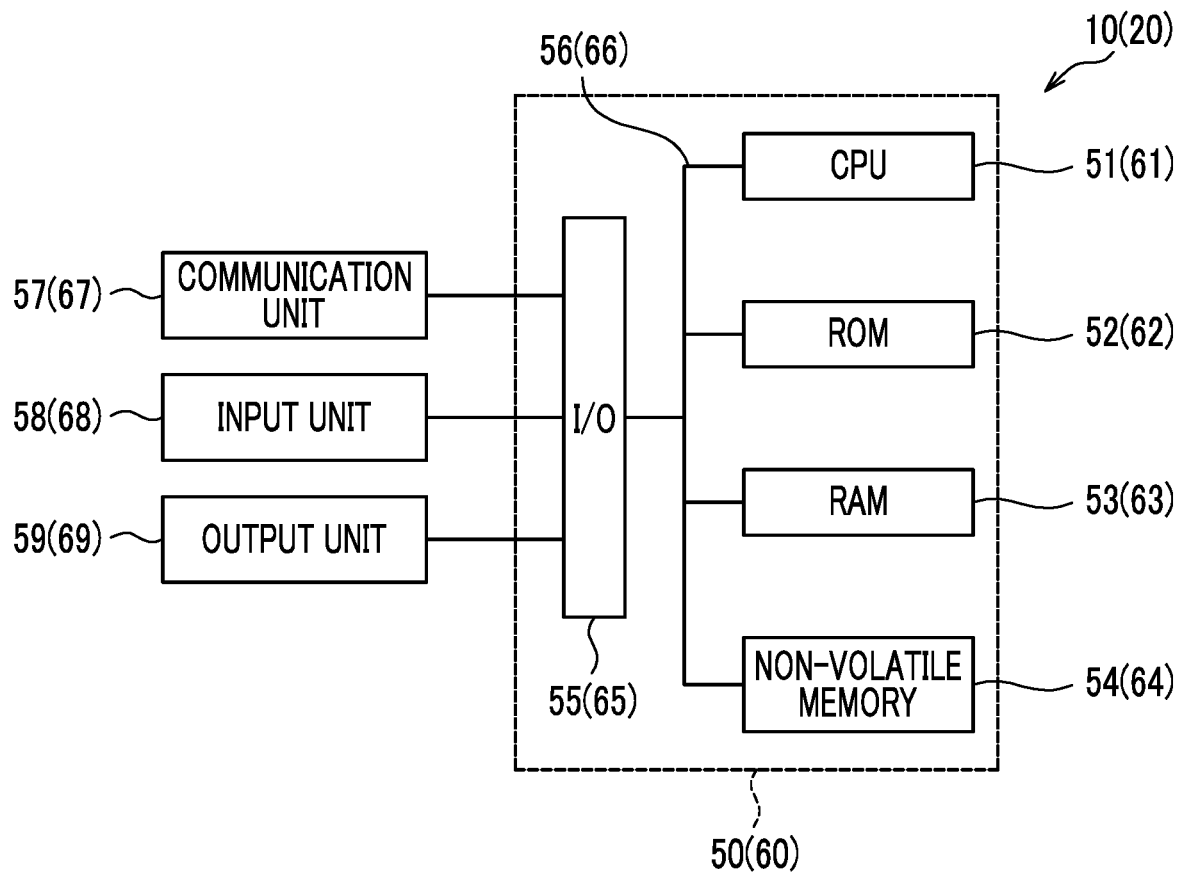
FIG. 7 is a diagram illustrating a basic configuration example of an electric system in the user terminal and the file management apparatus.

FIG. 7 is a diagram illustrating a basic configuration example of an electrical system in the user terminal 10. As previously described, for example, the user terminal 10 is configured using a computer 50.

The computer 50 includes a central processing unit (CPU) 51 controlling each function part related to the user terminal 10, a read only memory (ROM) 52 storing a user terminal program causing the computer 50 to function as each function part illustrated in FIG. 3, a random access memory (RAM) 53 used as a temporary work area of the CPU 51, a non-volatile memory 54, and an input-output interface (I/O) 55. The CPU 51, the ROM 52, the RAM 53, the non-volatile memory 54, and the I/O 55 are connected to each other through a bus 56.

The non-volatile memory 54 is one example of a storage device that maintains stored information even in a case where power supplied to the non-volatile memory 54 is stopped. For example, a semiconductor memory is used. A hard disk may also be used. The non-volatile memory 54 does not need to be incorporated in the computer 50 and may be a portable storage device such as a memory card that is attached to and detached from the computer 50.

For example, a communication unit 57, an input unit 58, and an output unit 59 are connected to the I/O 55.

The communication unit 57 is connected to the communication line 2 and includes a communication protocol for performing data communication with each apparatus connected to the communication line 2.

The input unit 58 is a device that receives an instruction from the user and notifies the CPU 51 of the instruction. For example, a button, a touch panel, a keyboard, and a mouse are used as the input unit 58. In a case where the instruction from the user is provided as voice, a microphone may be used as the input unit 58.

The output unit 59 is a device that provides a notification of information processed by the CPU 51. For example, a liquid crystal display, an organic electro luminescence (EL) display, and a projector projecting a video to a screen are used as the output unit 59. In the case of providing the notification of the information as voice, a speaker may be used as the output unit 59.

A basic configuration example of an electrical system in the file management apparatus 20 is the same as the basic configuration example of the electrical system in the user terminal 10 illustrated in FIG. 7. The file management apparatus 20 is configured using a computer 60.

Accordingly, in the file management apparatus 20, the CPU 51, the ROM 52, the RAM 53, the non-volatile memory 54, the I/O 55, the bus 56, the communication unit 57, the input unit 58, and the output unit 59 of the user terminal 10 are replaced with a CPU 61, a ROM 62, a RAM 63, a non-volatile memory 64, an I/O 65, a bus 66, a communication unit 67, an input unit 68, and an output unit 69, respectively.

The CPU 61 controls each function part related to the file management apparatus 20 illustrated in FIG. 4. The ROM 62 stores a file management program that causes the computer 60 to function as each function part illustrated in FIG. 4. The RAM 63 is used as a temporary work area of the CPU 61. The input unit 68 receives an instruction from the manager of the file management apparatus 20 and not the instruction from the user. Units connected to the I/O 55 of the user terminal 10 and the I/O 65 of the file management apparatus 20 are not limited to the units illustrated in FIG. 7. Other units may be connected.

Figure 8:
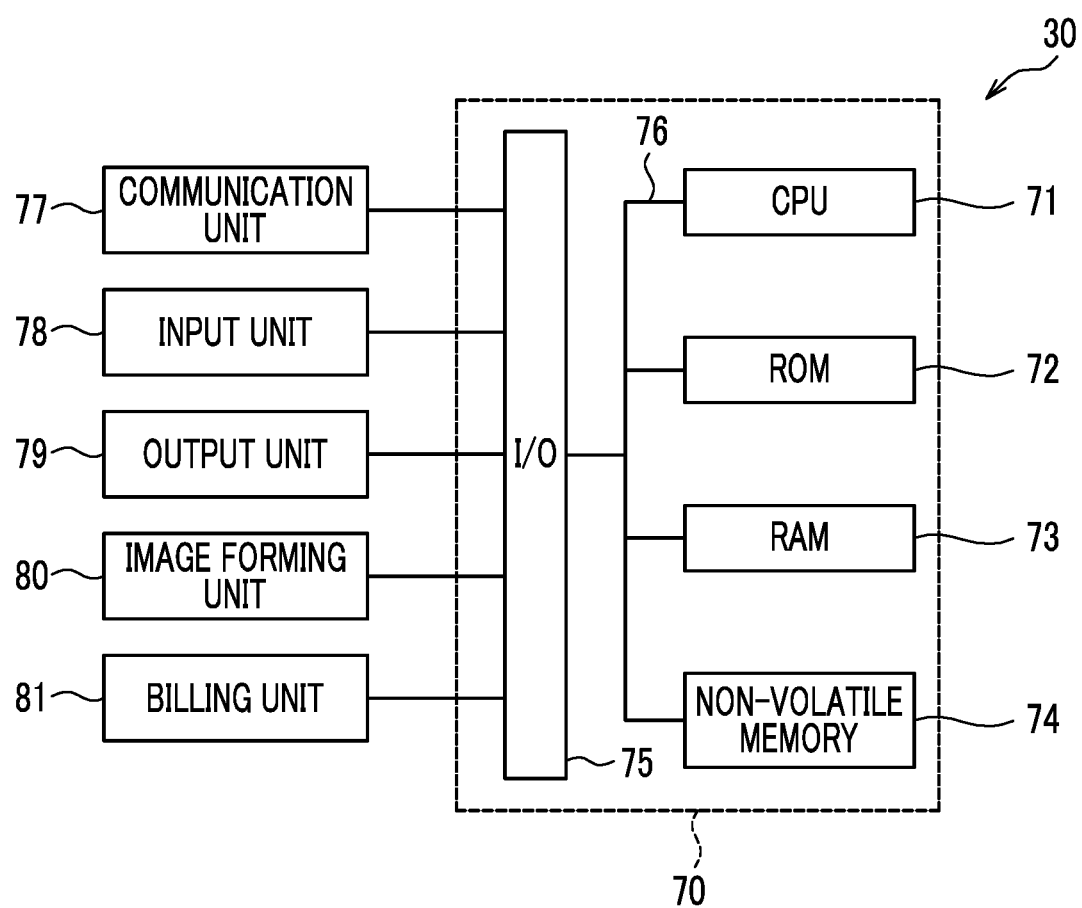
FIG. 8 is a diagram illustrating a basic configuration example of an electric system in the output apparatus.

FIG. 8 is a diagram illustrating a basic configuration example of an electrical system in the output apparatus 30. For example, the output apparatus 30 is configured using a computer 70.

The computer 70 includes a CPU 71 controlling each function part related to the output apparatus 30, a ROM 72 storing an output program causing the computer 70 to function as each function part illustrated in FIG. 6, a RAM 73 used as a temporary work area of the CPU 71, a non-volatile memory 74, and an I/O 75. The CPU 71, the ROM 72, the RAM 73, the non-volatile memory 74, and the I/O 75 are connected to each other through a bus 76.

For example, a communication unit 77, an input unit 78, an output unit 79, an image forming unit 80, and a billing unit 81 are connected to the I/O 75.

The communication unit 77 is connected to the communication line 2 and includes a communication protocol for performing data communication with each apparatus connected to the communication line 2.

The input unit 78 is a device that receives an instruction from the output user and notifies the CPU 71 of the instruction. For example, a button and a touch panel are used as the input unit 78. In a case where the instruction from the output user is provided as voice, a microphone may be used as the input unit 78. In addition, an input-output device that inputs and outputs data like a card slot for reading and writing data on a memory card and a universal serial bus (USB) port is one example of the input unit 78.

The output unit 79 is a device that provides a notification of information processed by the CPU 71. For example, a liquid crystal display and an organic EL display are used as the output unit 79. In the case of providing the notification of the information as voice, a speaker may be used as the output unit 79.

The image forming unit 80 is a unit that prints the content of the file on the recording medium in accordance with an instruction from the CPU 71. A printing system in the image forming unit 80 may be any method. For example, an electrophotographic system or an ink jet system may be used.

The billing unit 81 is a device that collects a fee from the output user and notifies the CPU 71 that payment is made in a case where the file output in the output apparatus 30 is a file having a fee. For example, the billing unit 81 corresponds to at least one fee payment method of cash, a prepaid card, or electronic payment using electronic money, a credit card, and a barcode.

Units connected to the I/O 75 of the output apparatus 30 are not limited to the units illustrated in FIG. 8. Necessary units are connected depending on the file output method in the output apparatus 30. In addition, the output apparatus 30 may have plural functions related to image formation such as a facsimile function, a scan function, and a copy function in order to provide various services to the user.

In a case where the output apparatus 30 has the facsimile function, a facsimile unit that performs facsimile communication with other facsimile apparatuses through a facsimile line, not illustrated, is connected to the I/O 75. In a case where the output apparatus 30 has the scan function, for example, a scan unit that optically reads the content of an original document set on a platen glass and converts the content of the original document into image data in accordance with an instruction from the CPU 71 is connected to the I/O 75. In a case where the output apparatus 30 has the copy function, the scan unit is connected to the I/O 75, and the CPU 71 causes the image forming unit 80 to print the image data of the original document read by the scan unit on the recording medium.

Next, the operation of the file management apparatus 20 that manages the file such that the file requested by the output user is provided from the output apparatus 30 even in a case where the expired file is requested from the output user will be described.

Figure 9:
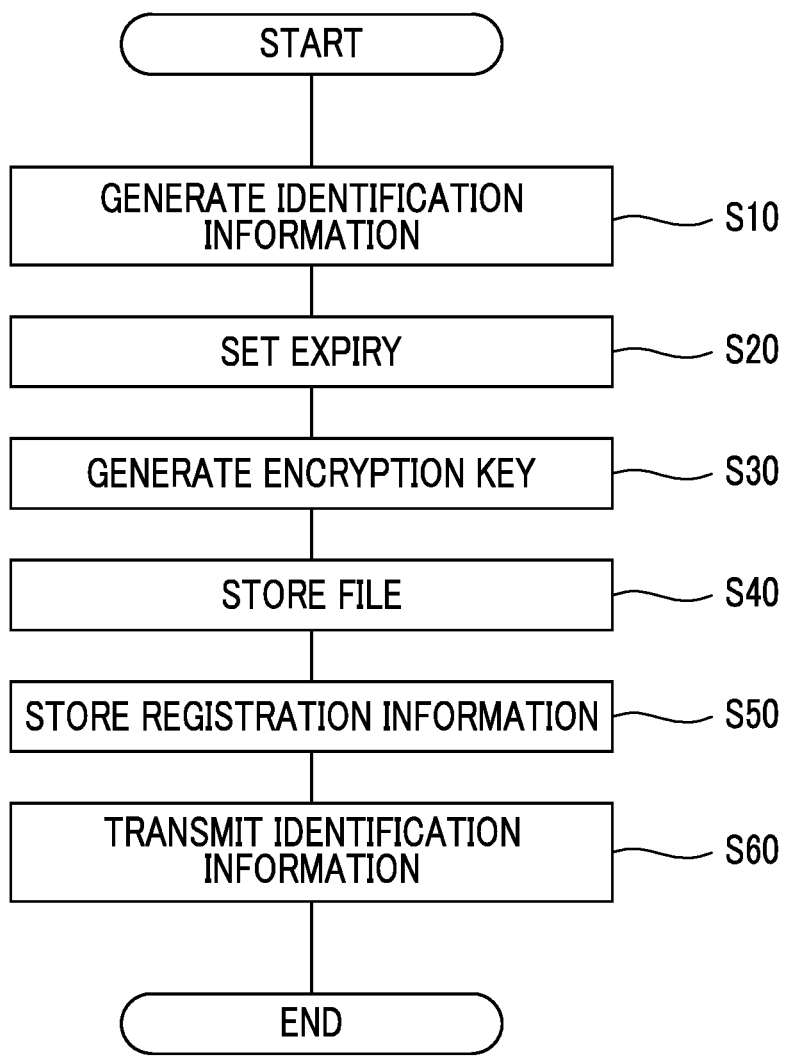
FIG. 9 is a flowchart illustrating one example of a flow of registration process in the file management apparatus.
Figure 10:
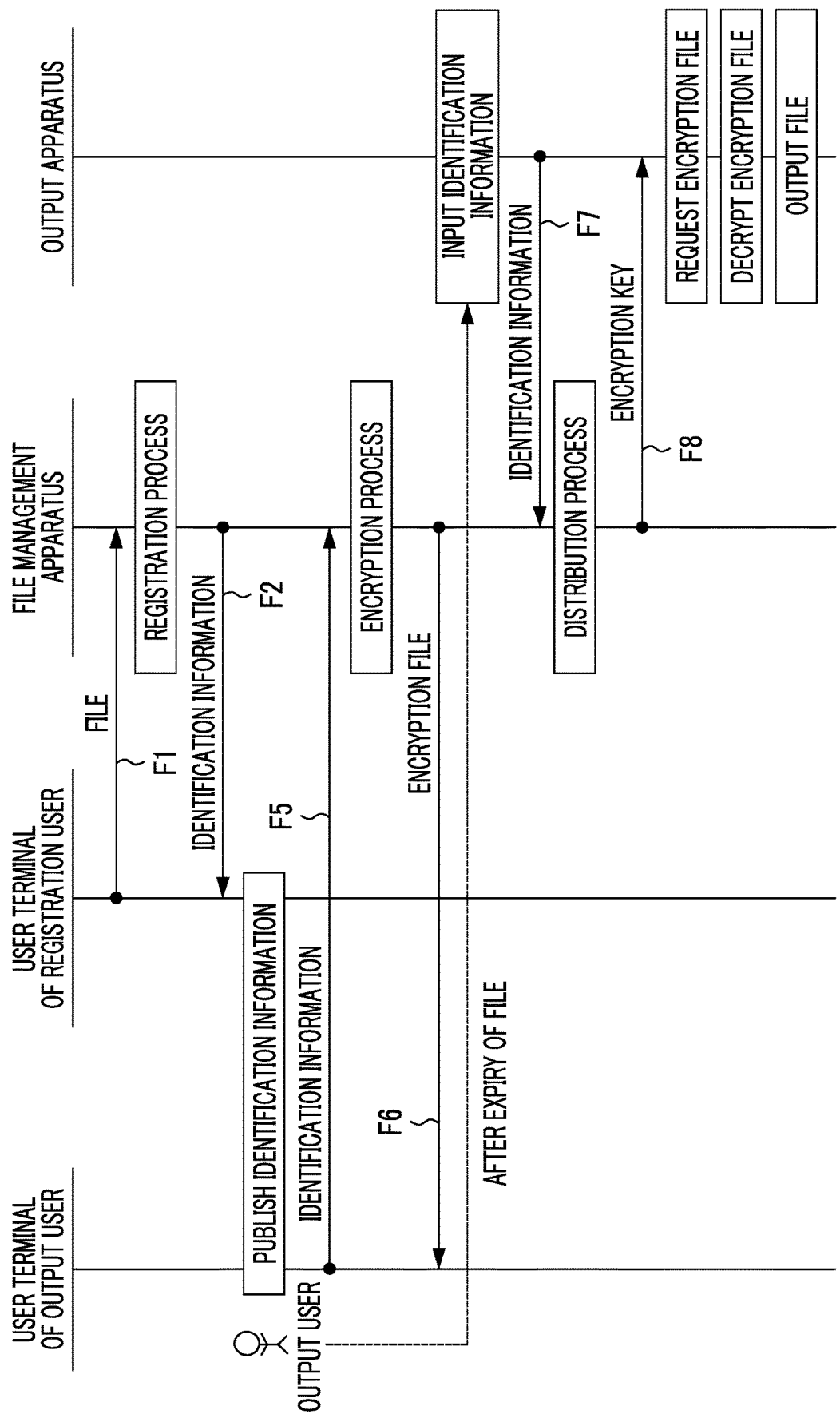
FIG. 10 is a sequence diagram illustrating another example of the flow of information in the file management system.

FIG. 9 is a flowchart illustrating one example of a flow of registration process executed by the CPU 61 of the file management apparatus 20 in a case where the file is received from the user terminal 10 operated by the registration user. In addition, FIG. 10 is one example of a sequence diagram illustrating a flow of information according to the present exemplary embodiment. For example, the file management program defining the registration process is stored in advance in the ROM 62 of the file management apparatus 20. The CPU 61 of the file management apparatus 20 reads the file management program stored in the ROM 62 and executes the registration process.

In a case where the file is received from the user terminal 10 (F1 in FIG. 10), the CPU 61 executes the registration process. First, in step S10, the CPU 61 generates the identification information for the received file. While a text is used as the identification information according to the present exemplary embodiment, the identification information may be represented in any format provided that the registered file is uniquely specified. Accordingly, the CPU 61 may represent the identification information as an image.

FIGS. 11A and 11B are diagrams illustrating an example of the identification information using the image. FIG. 11A is an example of using a barcode in the image. The identification information set for the file is obtained by reading the barcode.

In addition, FIG. 11B is an example in which a thumbnail image created by reducing the content of the received file is used as an image representing the identification information. The content of the file represented as the thumbnail image can be read using a well-known image recognition technology. Thus, the thumbnail image of the file may be used as the identification information. In the case of generating the thumbnail image, the CPU 61 processes the thumbnail image such that the identification information set for the file is displayed in a superimposed manner on the thumbnail image.

By processing the thumbnail image to be different from the content of the original file, the content of the file is not published even in a case where the registration user publishes the thumbnail image in order for the file to be used by other users. Accordingly, unauthorized secondary uses of the file are reduced compared to those in a case where the thumbnail image is published as the identification information of the file without processing the thumbnail image.

In the case of generating the thumbnail image, the CPU 61 may display other information such as the expiry of the file in addition to the identification information of the file.

In step S20, the CPU 61 sets the expiry for the received file.

In step S30, the CPU 61 generates the encryption key for the received file.

In step S40, the CPU 61 stores the received file in the file DB 27 and temporarily stores the directory information of the file in the file DB 27 in the RAM 63.

In step S50, the CPU 61 generates the registration information 29 of the received file using the identification information generated in step S10, the expiry of the file set in step S20, the encryption key generated in step S30, and the directory information of the file stored in the file DB 27 in step S40. The CPU 61 stores the generated registration information 29 in the file management DB 28.

In step S60, the CPU 61 controls the communication unit 67 to transmit the identification information generated in step S10 to the user terminal 10 as the transmission source of the file (F2 in FIG. 10).

As previously described, for example, the registration user receiving the identification information from the file management apparatus 20 publishes the identification information and the like by posting the identification information and the like on the SNS website for the shared usage of the registered file.

In a case where the identification information represented as a text or a barcode is generated in the file management apparatus 20, the registration user needs to separately create the introduction information such as the thumbnail image of the file indicating the summary of the file for the shared usage in order to promote the shared usage of the file to other users. However, in a case where the thumbnail image is generated as the identification information in the file management apparatus 20, the thumbnail image includes the content of the file or the summary of the file such as the identification information and the expiry of the file. Thus, the summary of the file including the identification information of the file for the shared usage is published by simply posting the thumbnail image on the SNS website.

As previously described, the output user who is interested in the content of the file by seeing the published identification information and the like of the file and desires to output the file may visit the store 40 and input the identification information of the desired file into the output apparatus 30. However, there is also an output user who cannot visit the store 40 within the expiry of the file due to various reasons.

In a case where the file expires, the file is deleted from the file management apparatus 20. Thus, the output user who cannot visit the store 40 within the expiry of the file inputs the published identification information of the file into the user terminal 10 and transmits the identification information of the desired file to the file management apparatus 20 within the expiry of the desired file (F5 in FIG. 10).

FIG. 12 is a diagram illustrating one example of an application screen 15A for an application for outputting the file from the output apparatus 30 even after the expiry of the file. The application screen 15A is displayed on the output unit 59 of the user terminal 10 in accordance with an instruction from the output user. For example, the output user inputs the identification information of the file on the application screen 15A by pressing a keyboard and presses an "apply" button. By pressing the "apply" button, the identification information of the file input on the application screen 15A is transmitted to the file management apparatus 20.

In a case where an image is used as the identification information of the file, an application screen 15B illustrated in FIG. 13 is used. The output user inputs the identification information on the application screen 15B by performing an operation called a "drop" by selecting the image representing the identification information of the desired file and moving the image onto the application screen 15B or by pressing a "reference" button and selecting the image representing the identification information of the desired file. In a case where the identification information is generated as a text, the output user needs to input the text on the application screen 15A with reference to the identification information. Thus, mistakes may be made in the input of the text. However, in a case where the identification information is generated as an image, the identification information is input on the application screen 15B by simply selecting the image. Thus, mistakes in the input of the identification information are reduced compared to those in a case where the identification information is generated as a text.

In a case where the identification information is generated as a text, the output user can make a note of the identification information on paper and the like or memorize the identification information. However, in a case where the identification information is generated as an image (particularly, a barcode), it may not be easy to perceive the identification information from the image. Thus, a situation in which the identification information cannot be input on the application screen 15B may occur without the image received from the file management apparatus 20.

Figure 14:
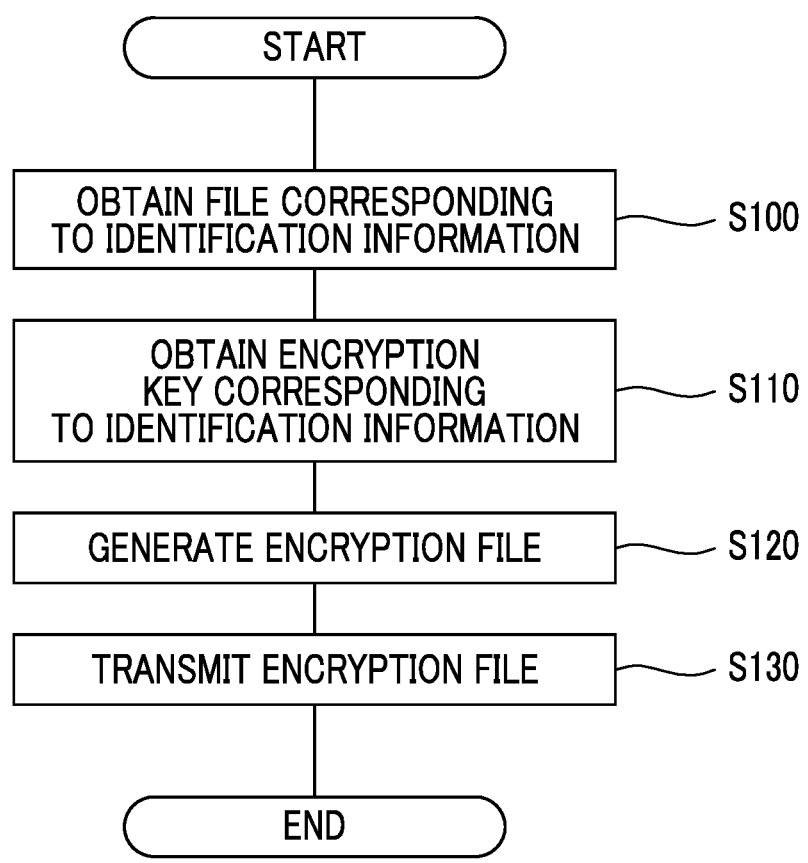
FIG. 14 is a flowchart illustrating one example of a flow of encryption process in the file management apparatus.

FIG. 14 is a flowchart illustrating one example of a flow of encryption process executed by the CPU 61 of the file management apparatus 20 in a case where the identification information is received from the user terminal 10 operated by the output user.

For example, the file management program defining the encryption process is stored in advance in the ROM 62 of the file management apparatus 20. The CPU 61 of the file management apparatus 20 reads the file management program stored in the ROM 62 and executes the encryption process.

In step S100, the CPU 61 obtains the registration information 29 of the file for which the identification information received from the user terminal 10 is set from the file management DB 28. For convenience of description, the registration information 29 of the file for which the received identification information is set will be referred to as the "target registration information 29". Furthermore, the CPU obtains the file corresponding to the identification information from the file DB 27 by referring to the file information of the obtained target registration information 29.

In step S110, the CPU 61 obtains the encryption key corresponding to the received identification information from the target registration information 29.

In step S120, the CPU 61 generates the encryption file of the file corresponding to the identification information by encrypting the file obtained in step S100 using the encryption key obtained in step S110. For example, a well-known encryption method such as data encryption standard (DES) is used in the encryption of the file using the encryption key.

In step S130, the CPU 61 controls the communication unit 67 to transmit the encryption file of the file corresponding to the identification information and generated in step S120 to the user terminal 10 as the transmission source of the identification information (F6 in FIG. 10).

Accordingly, the output user who cannot output the file in the output apparatus 30 within the expiry of the file obtains the encryption file of the desired file.

In a case where the registration information 29 of the file for which the identification information received in step S100 is set is not present, the CPU 61 regards the registration information 29 of the file as being deleted because the file corresponding to the identification information is expired. In this case, the CPU 61 transmits a notification indicating to the output user that the encryption file cannot be transmitted because the requested file is expired to the user terminal 10 as the transmission source of the identification information.

The CPU 61 does not store the generated encryption file in the file DB 27 and deletes the encryption file. Accordingly, for example, the vacant capacity of the storage device in which the file DB 27 is implemented is increased compared to that in a case where the encryption file is stored in the file DB 27 until the expiry of the file as the generation source of the encryption file.

In addition, instead of generating the encryption file in step S120, the CPU 61 may generate the encryption file in advance in the registration process illustrated in FIG. 9 and store the encryption file in the file DB 27 and store the file information indicating the storage location of the encryption file in the file DB 27 in the registration information 29. In this case, the encryption file does not need to be generated each time the identification information is received from the user terminal 10. However, the encryption file is also stored in the file DB 27 until the expiry of the file. Accordingly, the vacant capacity of the storage device in which the file DB 27 is implemented is reduced compared to that in a case where the encryption file is generated in step S120 of the encryption process illustrated in FIG. 14.

In addition, the user who cannot visit the store 40 within the expiry of the file is not always present. Thus, the encryption file stored in the file DB 27 may not be used even once. Accordingly, the storage capacity of the storage device in which the file DB 27 is implemented may be wasted.

As will be described below, in order to output the expired file in the output apparatus 30, the output user needs the identification information of the file and the encryption file of the file corresponding to the identification information.

Accordingly, in a case where the identification information of the file and the encryption file are separately stored in the user terminal 10, for example, in a case where plural encryption files are stored in the user terminal 10, a correspondence between the encryption file and the identification information may not be known.

Thus, in the case of transmitting the encryption file to the user terminal 10 in step S130, the CPU 61 may transmit the identification information received from the user terminal 10 to the user terminal 10 in association with the generated encryption file. Specifically, the CPU 61 combines the identification information received from the user terminal 10 with the generated encryption file and transmits the identification information and the encryption file together to the user terminal 10. Accordingly, the identification information and the encryption file are stored in association with each other in the user terminal 10.

Besides, the CPU 61 may associate the identification information with the encryption file by including the identification information in the file name of the encryption file.

The output user obtaining the encryption file of the desired file stores the encryption file in a smartphone as one example of the user terminal 10 or a semiconductor memory such as a memory card, visits the store 40 after the expiry of the file, and outputs the file from the output apparatus 30.

In a case where the identification information is represented as an image, the image representing the identification information is also stored in the user terminal or the semiconductor memory. In a case where the identification information is represented as a text, for example, the output user does not need to store the identification information in the user terminal 10 or the semiconductor memory by making a note of the identification information on paper and the like.

The output user outputting the expired file first inputs the identification information of the file into the output apparatus 30.

Figure 15:
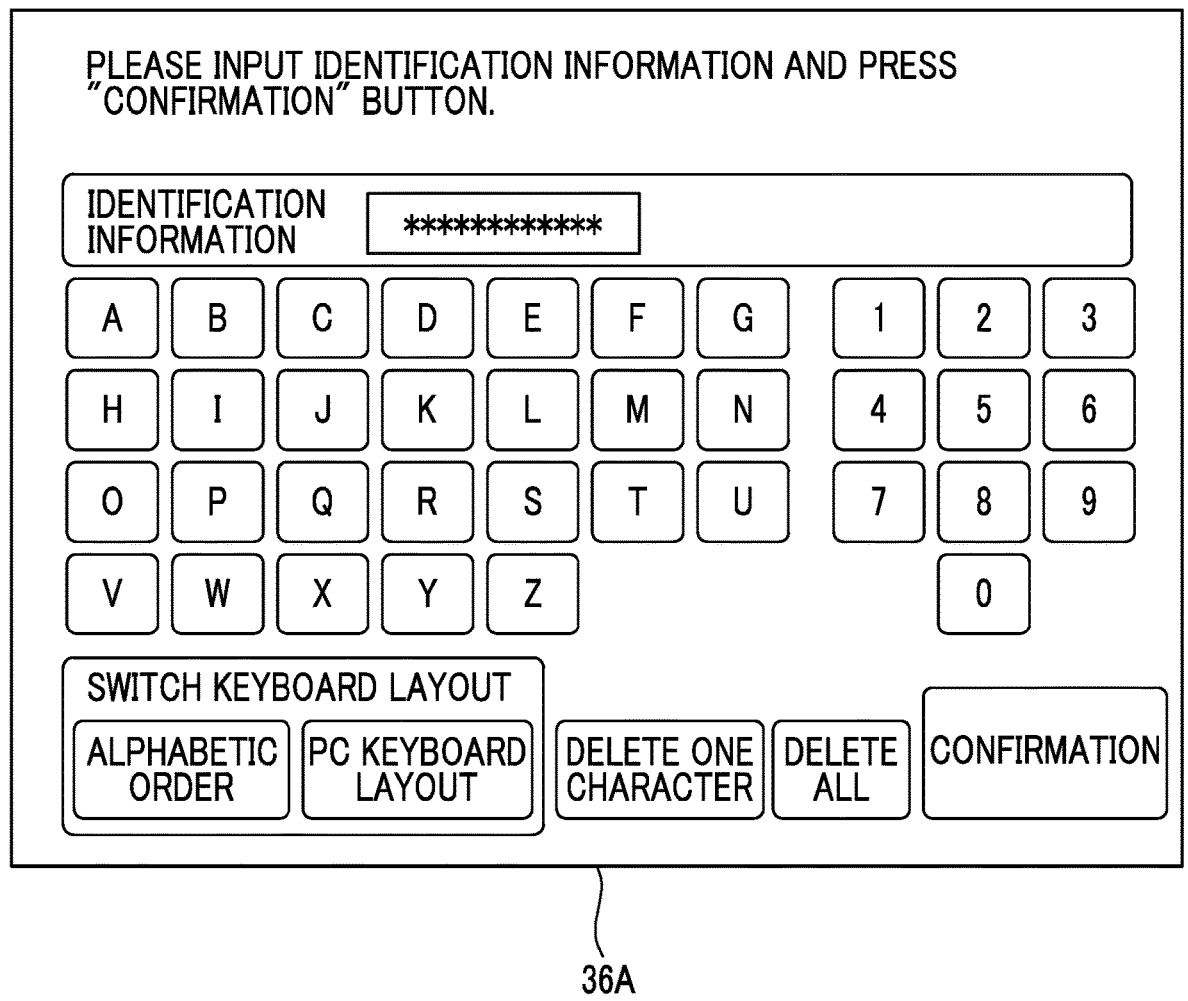
FIG. 15 is a diagram illustrating an example of an input screen for inputting the identification information represented as a text.

FIG. 15 is a diagram illustrating an example of an input screen 36A of the identification information that is displayed on the output unit 79 of the output apparatus 30 and corresponds to a case where the identification information is represented as a text. For example, a touch panel is arranged in a superimposed manner on the output unit 79. Thus, the output user inputs the identification information of the desired file into the output apparatus 30 by pressing a keyboard included in the input screen 36A and confirms the identification information to be transmitted to the file management apparatus 20 by pressing a "confirmation" button.

In a case where the output apparatus 30 includes a microphone and a voice recognition function, the output user may input the identification information into the output apparatus 30 by voice.

Figure 16:
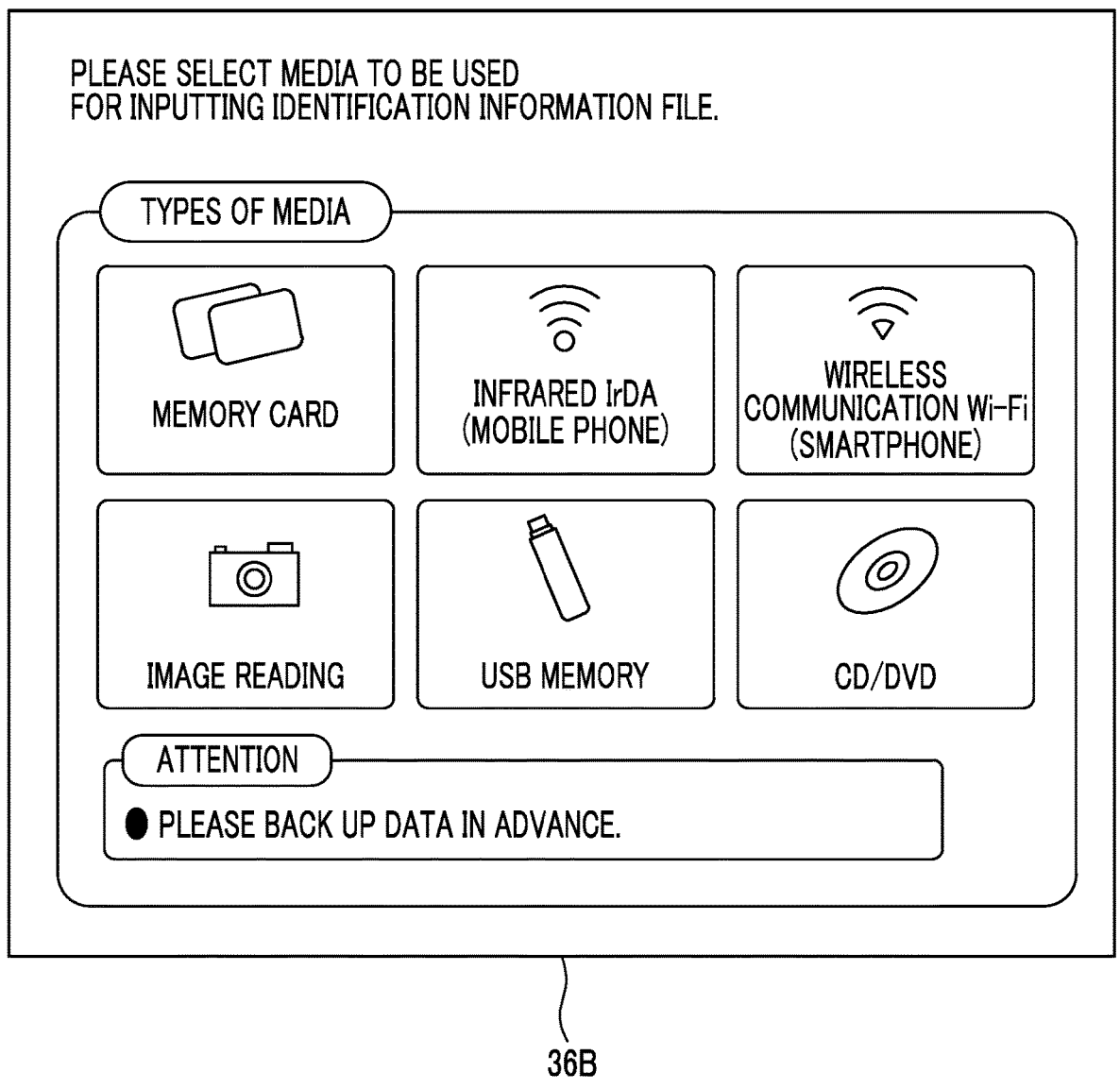
FIG. 16 is a diagram illustrating an example of an input screen for inputting the identification information represented as an image.

FIG. 16 is a diagram illustrating an example of an input screen 36B of the identification information corresponding to a case where the identification information is represented as an image. The input screen 36B includes buttons corresponding to an input of the identification information using a memory card, an input of the identification information using infrared communication with the user terminal 10, and an input of the identification information based on wireless communication using a wireless LAN or Bluetooth (registered trademark) with the user terminal 10. In addition, the input screen 36B includes buttons corresponding to an input of the identification information by reading the image using a camera, an input of the identification information using a USB memory, and an input of the identification information using an optical disc such as a compact disc (CD)-ROM and a digital versatile disc (DVD)-ROM.

The reading of the image using the camera is, for example, a form of inputting the identification information by displaying the image representing the identification information on the output unit 79 of the user terminal 10 and causing a camera included in the output apparatus 30 to read the image representing the identification information and displayed on the output unit 79. Particularly, in a case where the image representing the identification information is a barcode, the identification information may be converted into a text inside the output apparatus 30 by reading the image using the camera.

In a case where the output user selects an input form of the identification information appropriate for the output user by pressing any button of the input screen 36B, the identification information is read into the output apparatus in the selected input form of the identification information.

For example, in a case where the output user selects the input of the identification information using the memory card by inserting the memory card storing the image representing the identification information into a card slot of the output apparatus 30, the image representing the identification information is read from the memory card.

Figure 17:
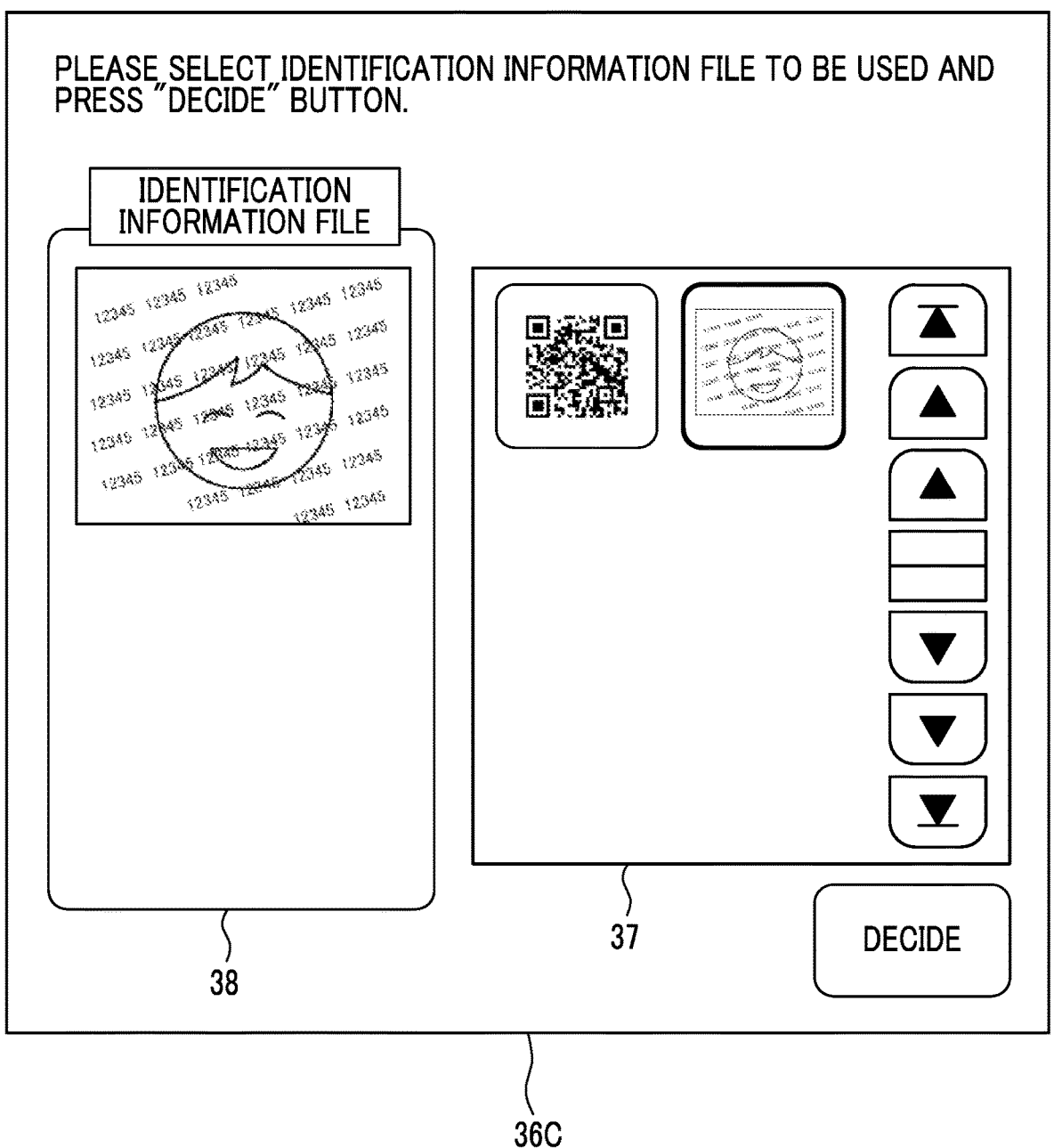
FIG. 17 is a diagram illustrating a selection screen for selecting the identification information represented as an image.

FIG. 17 is a diagram illustrating an example of a selection screen 36C for selecting the image representing the identification information and read into the output apparatus 30. In a case where the image representing the identification information stored in the user terminal 10, the memory card, or the like is read into the output apparatus 30, the read image is displayed in a list display area 37 of the selection screen 36C. In a case where the output user selects an image corresponding to the identification information of the desired file from the list display area 37, the selected image is displayed in a selection display area 38. The output user confirms the image to be transmitted to the file management apparatus 20 by pressing a "decide" button.

Figure 18:
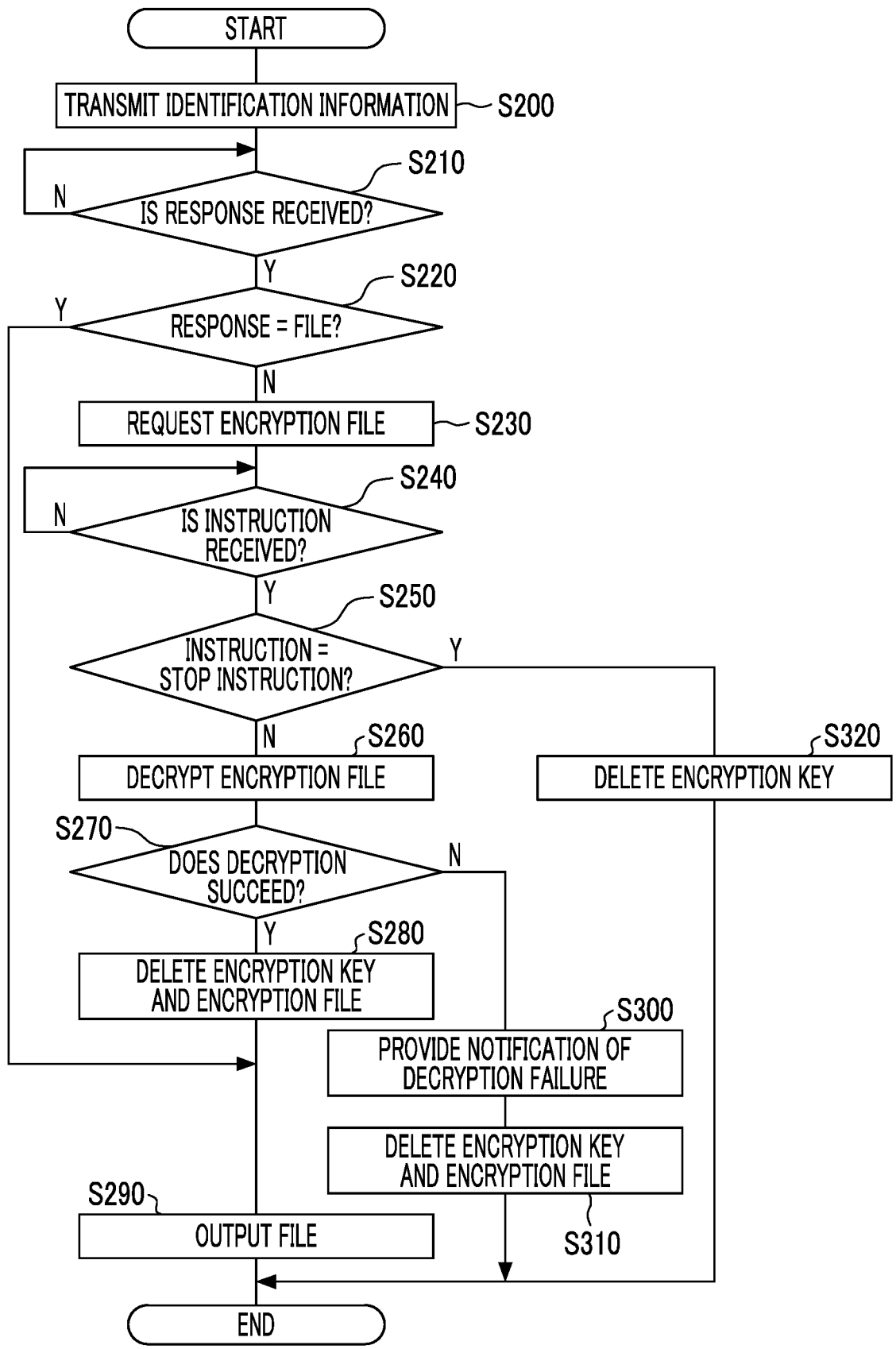
FIG. 18 is a flowchart illustrating one example of a flow of output process in the output apparatus.

FIG. 18 is a flowchart illustrating one example of a flow of output process executed by the CPU 71 of the output apparatus 30 in a case where the output user inputs the identification information of the desired file into the output apparatus 30.

For example, the output program defining the output process is stored in advance in the ROM 72 of the output apparatus 30. The CPU 71 of the output apparatus 30 reads the output program stored in the ROM 72 and executes the output process.

In step S200, the CPU 71 controls the communication unit 77 to transmit the input identification information to the file management apparatus 20 (F7 in FIG. 10). In a case where the identification information is input as a text, the CPU 71 transmits the text data as the identification information. In a case where the identification information is input as an image, the CPU 71 transmits image data of the input image as the identification information.

As will be described below, the file management apparatus 20 receiving the identification information executes the distribution process and notifies the output apparatus 30 of a response (F8 in FIG. 10).

In a case where the output user inputs the identification information of the expired file into the output apparatus 30, a notification of the encryption key corresponding to the identification information is provided as the response from the file management apparatus 20. In a case where the output user inputs the identification information of the file before the expiry of the file into the output apparatus 30, a notification of the file corresponding to the identification information is provided as the response from the file management apparatus 20.

Accordingly, in step S220, the CPU 71 determines whether or not the response to the identification information is received from the file management apparatus 20. In a case where the response is not received, the determination process of step S210 is repeatedly executed, and the notification of the response is monitored. In a case where the response is received, the response is stored in the RAM 73, and a transition is made to step S220.

In step S220, the CPU 71 determines whether or not the received response is the file. In a case where the received response is the file, a transition is made to step S290. In step S290, the CPU 71 controls the image forming unit 80 to output the file by printing the received file on the recording medium. Then, the CPU 71 ends the output process illustrated in FIG. 18. In a case where the file is output, the CPU 71 deletes the file from the RAM 73. By deleting the output file from the RAM 73, a leakage of the file to a third party through the output apparatus 30 is reduced compared to that in a case where the file remains stored in the RAM 73 even after the file is output.

In a case where the received response is not the file, that is, in a case where the encryption key is received, a transition is made to step S230.

The type of received response is obtained by referring to a response type included in the response. For example, a predetermined value such as "1" for the file and "2" for the encryption key is set in the response type.

The output apparatus 30 does not have the encryption file to be decrypted using the encryption key even in a case where the output apparatus 30 receives the encryption key from the file management apparatus 20. Accordingly, since the file cannot be output by simply receiving the encryption key, the CPU 71 requests the encryption file from the output user by providing a notification promoting an input of the encryption file to the output user in step S230. Specifically, the CPU 71 controls the output unit 79 to display a screen promoting the input of the encryption file on the output unit 79 or request the input of the encryption file by voice.

By providing a notification promoting the input of the encryption file, the output user inputs the encryption file obtained in advance into the output apparatus 30. The input encryption file is stored in the RAM 73 of the output apparatus 30.

Figure 19:
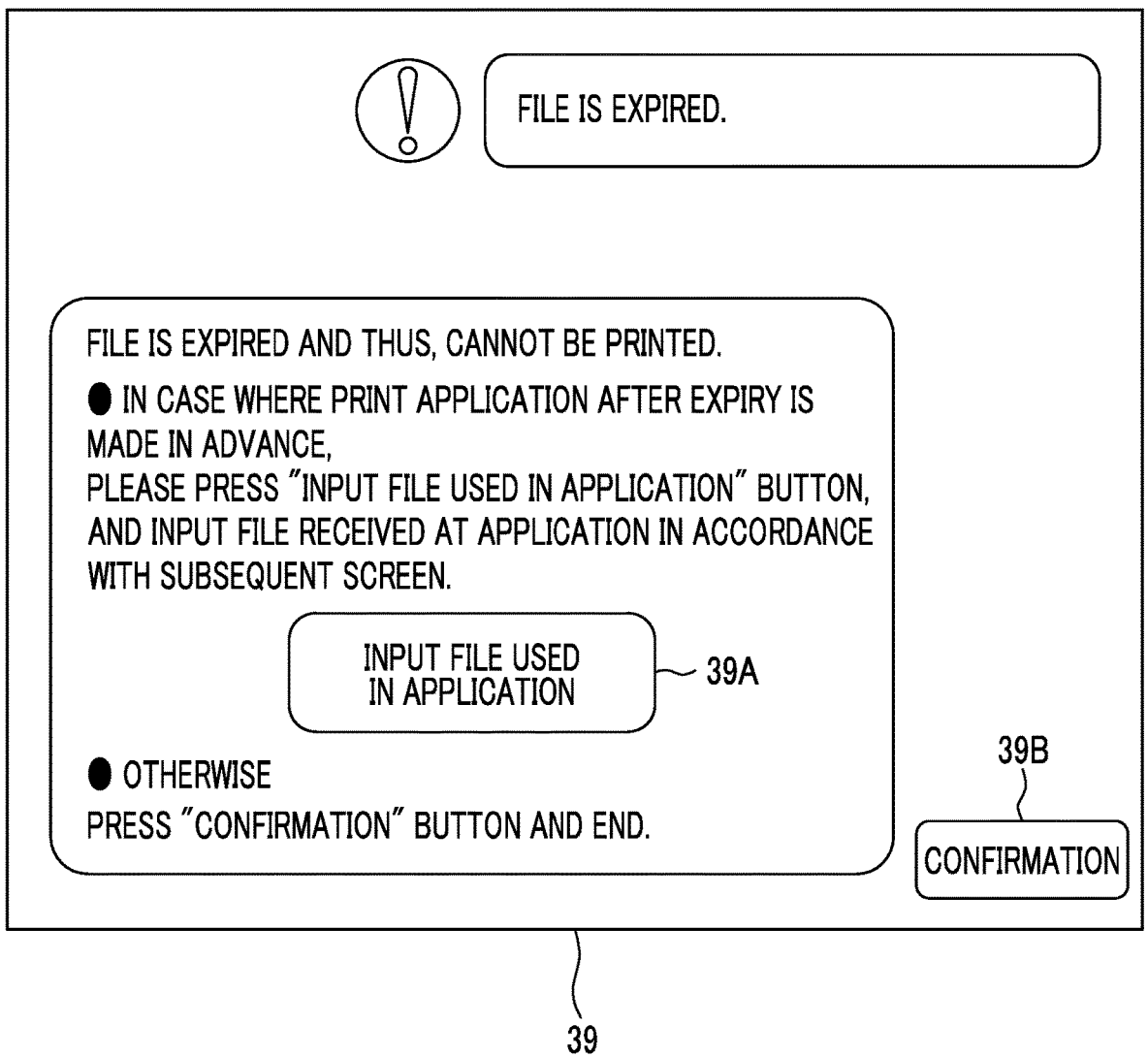
FIG. 19 is a diagram illustrating one example of a reception screen for receiving the encryption file.

FIG. 19 is a diagram illustrating one example of a reception screen 39 for receiving the encryption file. An input button 39A for inputting the encryption file is present in the reception screen 39 of the encryption file.

In a case where the input button 39A is pressed, buttons corresponding to various input forms illustrated in the input screen 36B of the identification information in FIG. 16 are displayed on the reception screen 39. That is, the input of the encryption file uses a form of inputting the encryption file into the output apparatus 30 by wirelessly connecting the user terminal 10 storing the encryption file to the output apparatus 30 or a form of inputting the encryption file into the output apparatus 30 by mounting the semiconductor memory storing the encryption file in the output apparatus 30. Even in a case where the content of the encryption file is displayed on the screen, meaningful information is not displayed. Thus, the display of the content of the encryption file does not correspond to the reading of the encryption file using the camera.

In a case where the encryption file is input into the output apparatus 30, the CPU 71 is notified of a continuation instruction for continuing the output of the file.

Among the output users, there is a user who does not have the encryption file or does not know which encryption file is the encryption file of the file corresponding to the identification information input into the output apparatus 30. Accordingly, a confirmation button 39B for notifying the output apparatus 30 of a stop instruction for stopping the output of the file is also arranged in the reception screen 39 of the encryption file.

Accordingly, in the case of continuing the output of the file, the output user presses the input button 39A and then, inputs the encryption file into the output apparatus 30. In the case of stopping the output of the file, the output user presses the confirmation button 39B.

In step S240, the CPU 71 determines whether or not an instruction related to file output is received from the output user. In a case where the instruction related to file output is not received, the determination process of step S240 is repeatedly executed, and the CPU 71 waits until the instruction is provided from the output user. In a case where the instruction related to file output is received, a transition is made to step S250.

In step S250, the CPU 71 determines whether or not the received instruction is the stop instruction. In a case where the stop instruction is received, a transition is made to step S320. In step S320, the CPU 71 deletes the encryption key received from the file management apparatus 20 and stored in the RAM 73 and ends the output process illustrated in FIG. 18. In a case where the output of the file is stopped, the encryption key is deleted from the RAM 73. Thus, a leakage of the encryption file to the third party through the output apparatus 30 is reduced compared to that in a case where the encryption key remains stored in the RAM 73 even after the output of the file is stopped.

In the determination process of step S250, in a case where it is determined that the received instruction is not the stop instruction, that is, in a case where it is determined that the received instruction is the continuation instruction, a transition is made to step S260.

In step S260, the CPU 71 obtains the original file before encryption using the encryption key by decrypting the encryption file received along with the continuation instruction using the encryption key received from the file management apparatus 20. The decryption of the encryption file fails in a case where the output user erroneously inputs the encryption file of another file not corresponding to the input identification information.

Accordingly, in step S270, the CPU 71 determines whether or not the decryption of the encryption file succeeds. In a case where the decryption of the encryption file fails, a transition is made to step S300.

In step S300, the CPU 71 controls the output unit 79 to notify the output user that the output of the file is ended by displaying a screen providing a notification of the failure of decryption of the encryption file. In step S310, the CPU 71 deletes, from the RAM 73, the encryption key received from the file management apparatus 20 and stored in the RAM 73 and the encryption file received from the output user in order to reduce the leakage of information. The CPU 71 ends the output process illustrated in FIG. 18.

In the determination process of step S270, in a case where it is determined that the decryption of the encryption file succeeds, a transition is made to step S280.

In step S280, the CPU 71 deletes, from the RAM 73, the encryption key received from the file management apparatus 20 and stored in the RAM 73 and the encryption file received from the output user in order to reduce the leakage of information.

In step S290, the CPU 71 controls the image forming unit 80 to output the file by printing the file decrypted from the encryption file on the recording medium. Then, the CPU 71 deletes the file from the RAM 73 and ends the output process illustrated in FIG. 18.

In a case where a fee is set for the file, the CPU 71 outputs the file in step S290 after it is confirmed that a payment completion notification that is notified after the completion of payment of the fee is provided from the billing unit 81.

In the output apparatus 30, the output user outputs the file by performing a common operation of inputting the identification information into the output apparatus 30 without perceiving whether the file corresponding to the identification information is expired or is before the expiry of the file. While the output apparatus 30 switches the process performed until the output of the file depending on the response type from the file management apparatus 20 with respect to the identification information input by the output user, the output apparatus 30 advances the process while notifying the output user of an operation necessary for outputting the file. Thus, in a case where the output user performs the operation in accordance with an instruction from the output apparatus 30, the file corresponding to the identification information is output.

Next, the operation of the file management apparatus 20 receiving the identification information from the output apparatus 30 will be described.

Figure 20:
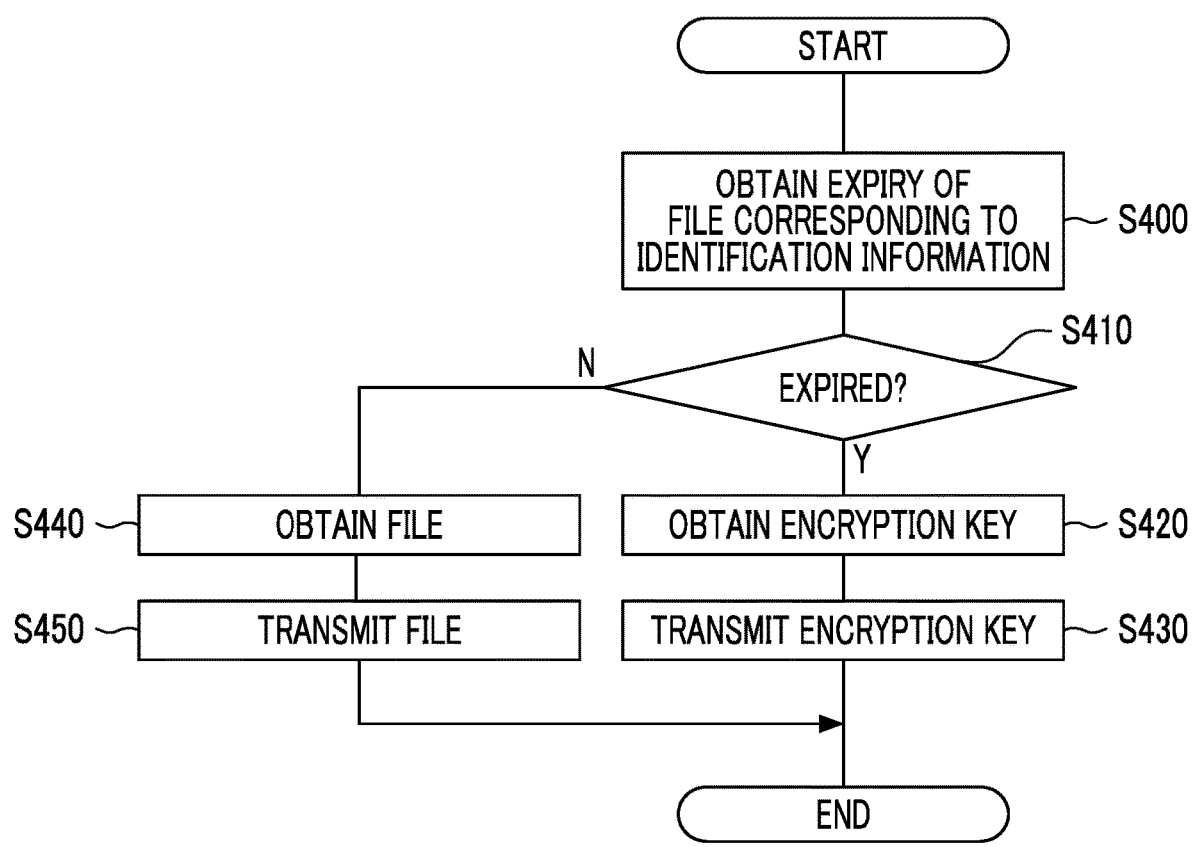
FIG. 20 is a flowchart illustrating one example of a flow of distribution process in the file management apparatus.

FIG. 20 is a flowchart illustrating one example of a flow of distribution process executed by the CPU 61 of the file management apparatus 20 in a case where the identification information is received from the output apparatus 30.

For example, the file management program defining the distribution process is stored in advance in the ROM 62 of the file management apparatus 20. The CPU 61 of the file management apparatus 20 reads the file management program stored in the ROM 62 and executes the distribution process.

In step S400, the CPU 61 obtains the registration information 29 of the file for which the identification information received from the output apparatus 30 is set, that is, the target registration information 29, from the file management DB 28. Furthermore, the CPU 61 obtains the expiry of the file corresponding to the identification information from the file DB 27 by referring to the file information of the obtained target registration information 29.

In a case where the identification information is represented as an image, the CPU 61 obtains the identification information from the image using a well-known image recognition method.

In step S410, the CPU 61 obtains the current date and time information and determines whether or not the file obtained in step S400 is expired. For example, the CPU 61 obtains the date and time information using a calendar function incorporated in the CPU 61. The CPU 61 may obtain the date and time information from a time server as one example of the external apparatuses connected to the communication line 2.

In a case where the file is expired, a transition is made to step S420. In step S420, the CPU 61 obtains the encryption key from the target registration information 29.

In step S430, the CPU 61 controls the communication unit 67 to transmit the encryption key obtained in step S420 to the output apparatus 30 as the transmission source of the identification information (F8 in FIG. 10).

In a case where the file is not expired, a transition is made to step S440. In step S440, the CPU 61 obtains the file corresponding to the identification information from the file DB 27 by referring to the file information of the obtained target registration information 29.

In step S450, the CPU 61 controls the communication unit 67 to transmit the file obtained in step S440 to the output apparatus 30 as the transmission source of the identification information (F4 in FIG. 2). The distribution process illustrated in FIG. 20 is ended.

In the file management system 1 according to the present exemplary embodiment, in a case where the file management apparatus 20 receives the identification information of the non-expired file from the user terminal 10, the encryption file of the file corresponding to the identification information is generated and transmitted to the user terminal 10. In a case where the file is expired, the file managed in the file management apparatus 20 is deleted. However, even after the expiry of the file, the encryption file generated from the file is stored in the user terminal 10.

Accordingly, in a case where the identification information of the expired file is input into the output apparatus 30, the file management apparatus 20 transmits the encryption key of the file to the output apparatus 30, and the encryption file of the output user is decrypted using the encryption in the output apparatus 30. The file desired by the output user is output from the output apparatus 30 even after the expiry of the file.

The encryption file is stored in the user terminal 10. Thus, the encryption file does not need to be stored in the file management apparatus 20. Instead, the file management apparatus 20 needs to store the encryption key for the output user who cannot visit the store 40 before the expiry of the file. However, since the encryption key occupies an ignorable capacity compared to the file and the encryption file, the file management system 1 can handle the output of the expired file without depletion of the vacant capacity of the storage device in the file management apparatus 20.

In the distribution process of the file management apparatus 20 illustrated in FIG. 20, in a case where the file corresponding to the identification information received from the output apparatus 30 is expired, the encryption key of the file is transmitted to the output apparatus 30. However, as previously described, there is an output user who stops the output of the file among the output users.

In such a case, the encryption key is deleted from the output apparatus 30 in step S320 in FIG. 18. However, the encryption key that does not need to be transmitted is sent to the outside of the file management apparatus 20 for a short period. Since the output user has the encryption file, the leakage of the encryption key may lead to decryption of the encryption file outside the output apparatus 30, and the restored file may be subjected to unauthorized secondary uses not permitted by the registration user. In addition, in a case where the file decrypted using the encryption key is a file having a fee, financial losses are caused.

Accordingly, hereinafter, the operation of the file management system 1 that transmits the encryption key to the outside of the file management apparatus 20 only when necessary will be described.

Figure 21:
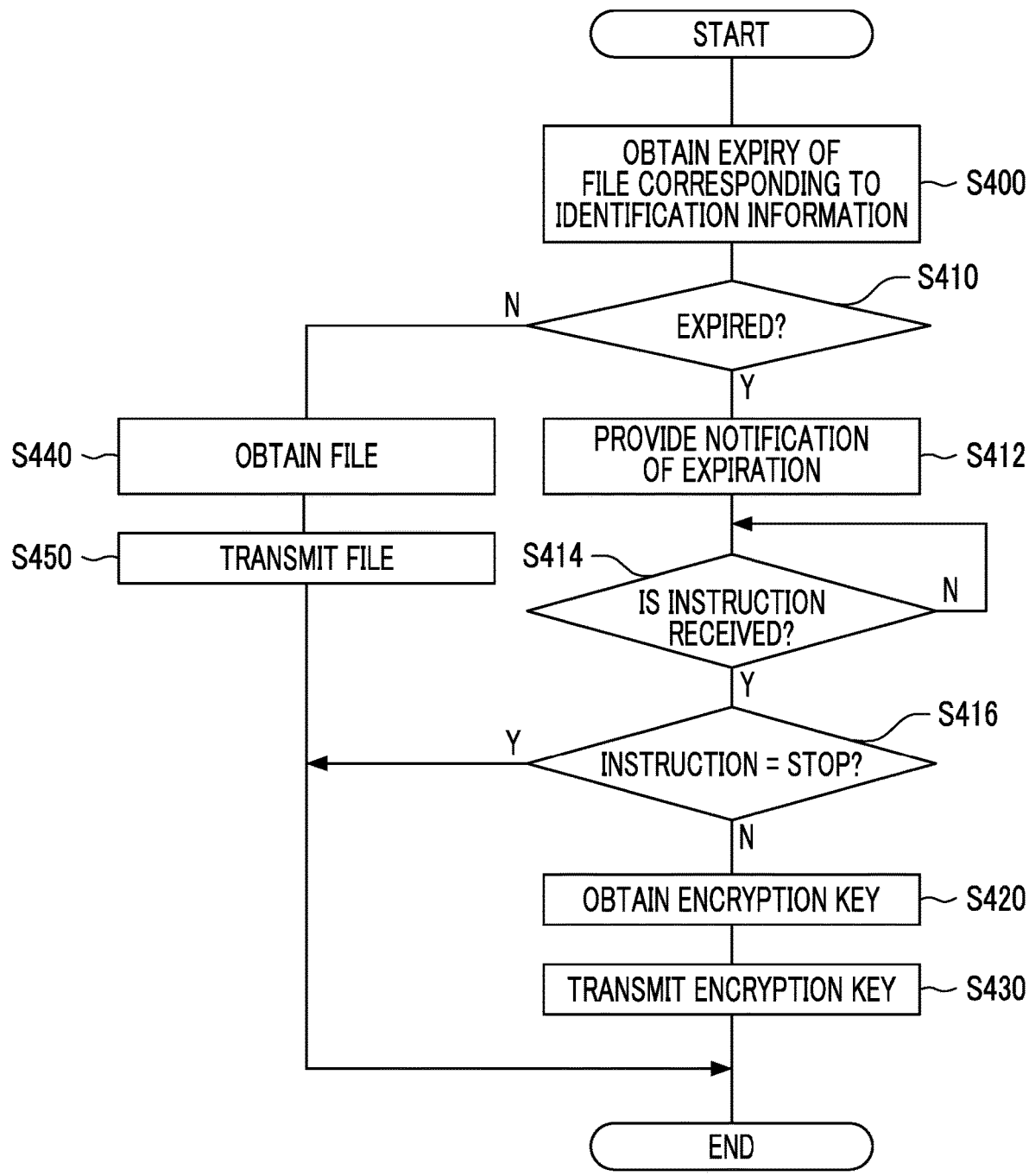
FIG. 21 is a flowchart illustrating another example of the flow of distribution process in the file management apparatus.

FIG. 21 is a flowchart illustrating a modification example of the flow of distribution process executed by the CPU 61 of the file management apparatus 20 in a case where the identification information is received from the output apparatus 30.

The distribution process illustrated in FIG. 21 is different from the distribution process illustrated in FIG. 20 in that the processes of steps S412 to S416 are added. Other processes are the same as the distribution process illustrated in FIG. 20. Accordingly, the processes of steps S412 to S416 will be described.

In the determination process of step S410, in a case where it is determined that the file obtained in step S400 is expired, step S412 is executed.

In step S412, the CPU 61 controls the communication unit 67 to transmit an expiration notification representing that the file corresponding to the identification information is expired to the output apparatus 30 as the transmission source of the identification information.

In the output apparatus 30, the expiration notification is received from the file management apparatus 20, and the output user is notified that the requested file is expired. The reception screen 39 of the encryption file illustrated in FIG. 19 is displayed on the output unit 79 of the output apparatus 30. In a case where the output user inputs the encryption file into the output apparatus 30 by pressing the input button 39A, the continuation instruction is transmitted to the file management apparatus 20. In a case where the output user presses the confirmation button 39B, the stop instruction is transmitted to the file management apparatus 20.

Accordingly, in step S414, the CPU 61 determines whether or not any of the continuation instruction or the stop instruction is received from the output apparatus 30. In a case where any instruction is not received, the determination process of step S414 is repeatedly executed, and the CPU 61 waits until any instruction is transmitted. In a case where any instruction is received from the output apparatus 30, a transition is made to step S416.

In step S416, the CPU 61 determines whether or not the instruction received from the output apparatus 30 is the stop instruction. In a case where the received instruction is not the stop instruction, that is, in a case where the continuation instruction is received, a transition is made to step S420, and the encryption key is transmitted to the output apparatus 30 in the process subsequent to step S420 since the encryption file as a decryption target is present in the output apparatus 30.

In the determination process of step S416, in a case where it is determined that the instruction received from the output apparatus 30 is the stop instruction, the distribution process illustrated in FIG. 21 is ended without transmitting the encryption key to the output apparatus 30. That is, in a case where the output user stops the output of the file, the file management apparatus 20 does not transmit the encryption key to the output apparatus 30.

Figure 22:
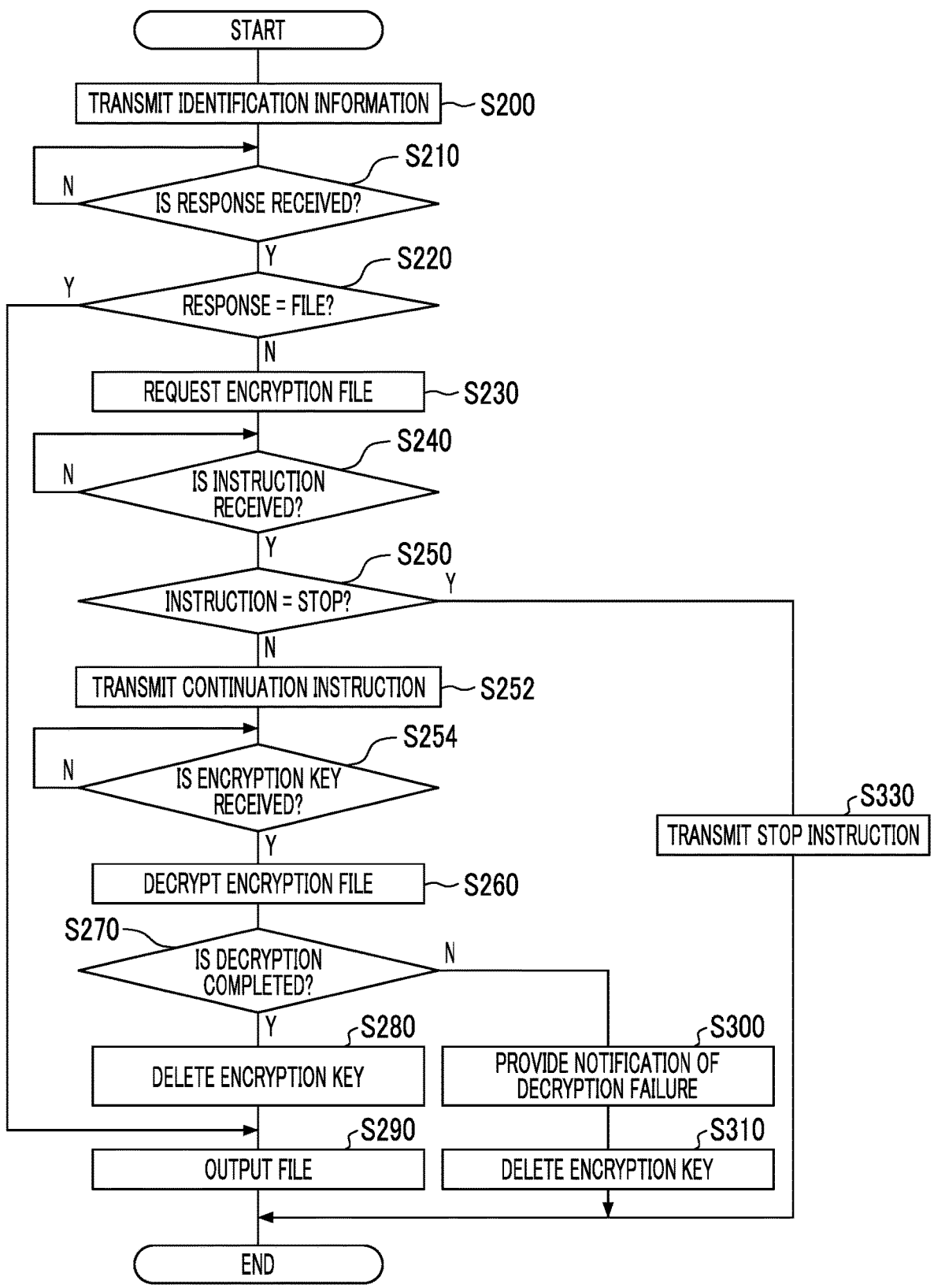
FIG. 22 is a flowchart illustrating another example of the flow of output process in the output apparatus.

FIG. 22 is a flowchart illustrating a modification example of the flow of output process executed by the CPU 71 of the output apparatus 30 in a case where the output user inputs the identification information of the desired file into the output apparatus 30. The output process illustrated in FIG. 22 is the output process of the output apparatus 30 corresponding to the distribution process of the file management apparatus 20 illustrated in FIG. 21.

The output process illustrated in FIG. 22 is different from the output process illustrated in FIG. 18 in that steps S252 and S254 are added, and step S320 is replaced with step S330. Other processes are the same as the output process illustrated in FIG. 18. Accordingly, the processes of steps S252, S254, and S330 will be described.

In the determination process of step S250, in a case where it is determined that the instruction received from the output user through the reception screen 39 of the encryption file is the continuation instruction and not the stop instruction, step S252 is executed.

In step S252, the CPU 71 controls the communication unit 77 to transmit the continuation instruction received from the output user to the file management apparatus 20.

As previously illustrated in FIG. 21, in a case where the file management apparatus 20 receives the continuation instruction from the output apparatus 30, the file management apparatus 20 transmits the encryption key of the file corresponding to the identification information. Accordingly, in step S254, the CPU 71 determines whether or not the encryption key is received from the file management apparatus 20. In a case where the encryption key is not received, the determination process of step S254 is repeatedly executed, and the CPU 71 waits until the encryption key is received.

In a case where the encryption key is received, a transition is made to step S260. The CPU 71 decrypts the encryption file using the received encryption key.

In addition, in the determination process of step S250, in a case where it is determined that the instruction received from the output user through the reception screen 39 of the encryption file is the stop instruction, a transition is made to step S330.

In step S330, the CPU 71 controls the communication unit 77 to transmit the stop instruction received from the output user to the file management apparatus 20. Accordingly, the encryption key is not transmitted to the output apparatus 30 from the file management apparatus 20. Thus, the encryption key that does not need to be transmitted is controlled not to be sent to the outside of the file management apparatus 20 even for a short period.

While the present invention is described thus far using the exemplary embodiment, the present invention is not limited to the scope disclosed in the exemplary embodiment. Various modifications or improvements can be made to the exemplary embodiment without departing from the nature of the present invention. Exemplary embodiments to which such modifications or improvements are made also fall within the technical scope of the present invention. For example, the order of processes may be changed without departing from the nature of the present invention.

While the form of implementing each process by software is illustratively described in the present exemplary embodiment, for example, processes equivalent to each flowchart illustrated in FIG. 9, FIG. 14, FIG. 18, and FIG. 20 to FIG. 22 may be implemented in an application specific integrated circuit (ASIC) and processed by hardware. In this case, the speed of the process is increased compared to that in a case where each process is implemented by software.

In addition, while the form of installing each program in the ROM is described in the exemplary embodiment, the form is not for limitation purposes. Each program according to the exemplary embodiment of the present invention can be provided as a recording in a computer readable recording medium. For example, each program according to the exemplary embodiment of the present invention may be provided as a recording on an optical disc such as a CD-ROM or a DVD-ROM. In addition, each program according to the exemplary embodiment of the present invention may be provided as a recording in a semiconductor memory such as a USB memory and a flash memory. Furthermore, the user terminal 10, the file management apparatus 20, and the output apparatus 30 may obtain each program according to the exemplary embodiment of the present invention through the communication line 2 from the external apparatuses connected to the communication line 2.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A file management apparatus comprising:
   a hardware processor, configured:
   to receive a file from a user terminal and generate an identification information of the file in the file management apparatus in response to receiving the file;
   to generate a registration information of the file using the identification information, an expiry of the file, key information associated with the identification information of the file, and a directory information of the file;
   to transmit the identification information from the file management apparatus to the user terminal to notify a user of the user terminal that a registration process of the file has been completed;
   to generate from the file a coded file having a content processed not to be browsed in a user terminal from a file using the key information associated with identification information of the file in a case where the identification information of the file is received from the user terminal before the expiry of the file in a storage device; and
   to perform control for transmitting the coded file generated to the user terminal as a transmission source of the identification information of the file and, in a case where the identification information of the file is received from the file management apparatus after the expiry of the file causing the content of the coded file input into the file management apparatus to be browsed using the key information by transmitting the key information associated with the identification information of the file to the file management apparatus as a transmission source of the identification information of the file,
   wherein the user terminal and the file management apparatus are different devices,
   the user terminal and the file management apparatus are connected to a communication line, the identification information is an identifier that is uniquely associated with the file, the file from a plurality of files registered in the file management apparatus are browsed by referring to the identification information of the file, and
   in a case where the registration information of the file is not present in the file management apparatus, the file is regarded to be deleted.

2. The file management apparatus according to claim 1, wherein in a case where the identification information of the file is received before the expiry of the file from the file management apparatus, the hardware processor performs control for transmitting the file associated with the received identification information to the file management apparatus as the transmission source of the identification information of the file and outputting a content of the transmitted file from the file management apparatus.

3. The file management apparatus according to claim 1, wherein the hardware processor performs control for transmitting the coded file generated using the key information associated with the identification information of the file to the user terminal in association with the identification information of the file.

4. The file management apparatus according to claim 2, wherein the hardware processor performs control for transmitting the coded file generated using the key information associated with the identification information of the file to the user terminal in association with the identification information of the file.

5. The file management apparatus according to claim 1, wherein the key information is an encryption key for encrypting the file, and
   the hardware processor generates an encryption file obtained by encrypting the file using the encryption key as the coded file.

6. The file management apparatus according to claim 2, wherein the key information is an encryption key for encrypting the file, and
   the hardware processor generates an encryption file obtained by encrypting the file using the encryption key as the coded file.

7. The file management apparatus according to claim 3, wherein the key information is an encryption key for encrypting the file, and
   the hardware processor generates an encryption file obtained by encrypting the file using the encryption key as the coded file.

8. The file management apparatus according to claim 4, wherein the key information is an encryption key for encrypting the file, and
   the hardware processor generates an encryption file obtained by encrypting the file using the encryption key as the coded file.

9. A non-transitory computer readable medium storing a file management program causing a computer to function as the hardware processor of the file management apparatus according to claim 1.

10. A non-transitory computer readable medium storing a file management program causing a computer to function as the hardware processor of the file management apparatus according to claim 2.

11. A non-transitory computer readable medium storing a file management program causing a computer to function as the hardware processor of the file management apparatus according to claim 3.

12. A non-transitory computer readable medium storing a file management program causing a computer to function as the hardware processor of the file management apparatus according to claim 4.

13. A non-transitory computer readable medium storing a file management program causing a computer to function as the hardware processor of the file management apparatus according to claim 5.

14. A non-transitory computer readable medium storing a file management program causing a computer to function as the hardware processor of the file management apparatus according to claim 6.

15. A file management system comprising:
the file management apparatus according to claim 1,
wherein the hardware processor performs control for switching an output process performed until an output of a content of the file depending on information received in response to identification information of the file and transmitted.

16. The file management system according to claim 15, wherein the hardware processor performs control for outputting the content of the received file in a case where the file corresponding to the identification information transmitted is received as the information, and providing a notification for inputting the coded file having the content of the file coded not to be browsed using the key information in a case where the key information used in browsing the content of the file is received as the information.

17. The file management system according to claim 16, wherein in a case where the input coded file is decoded using the key information, the hardware processor performs control for outputting the content of the coded file.

18. The file management system according to claim 16, wherein the hardware processor performs control for deleting the key information after the input coded file is decoded.

19. The file management system according to claim 15, wherein an image is used as the identification information of the file.

20. The file management system according to claim 19, wherein the image is a thumbnail image in which the content of the file is reduced and is processed to be different from the original content of the file.

* * * * *